United States Patent
Park et al.

(10) Patent No.: US 9,539,606 B2
(45) Date of Patent: Jan. 10, 2017

(54) MEMBER FOR SLOT DIE COATER, MOVABLE MEMBER FOR SLOT DIE COATER, AND SLOT DIE COATER INCLUDING THE MEMBERS TO PRODUCE ELECTRODE

(71) Applicant: LG CHEM, LTD., Seoul (KR)

(72) Inventors: Sung Hyun Park, Daejeon (KR); Chae Gyu Lee, Daejeon (KR); Ye Hoon Im, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 14/528,672

(22) Filed: Oct. 30, 2014

(65) Prior Publication Data

US 2015/0053133 A1 Feb. 26, 2015

Related U.S. Application Data

(63) Continuation of application No. PCT/KR2014/006397, filed on Jul. 15, 2014.

(30) Foreign Application Priority Data

Jul. 16, 2013 (KR) .................. 10-2013-0083475
Sep. 13, 2013 (KR) .................. 10-2013-0110127
(Continued)

(51) Int. Cl.
*B05C 5/02* (2006.01)
*H01M 4/04* (2006.01)
*H01M 4/139* (2010.01)

(52) U.S. Cl.
CPC .......... *B05C 5/0258* (2013.01); *B05C 5/0254* (2013.01); *H01M 4/0402* (2013.01);
(Continued)

(58) Field of Classification Search
None
See application file for complete search history.

(56) References Cited

U.S. PATENT DOCUMENTS

| 4,445,458 A * | 5/1984 | O'Brien | ............... B05C 5/0254 |
| | | | 118/401 |
| 5,587,184 A | 12/1996 | Leonard et al. | |
| 2004/0256496 A1* | 12/2004 | Harris | ............... B05C 5/0279 |
| | | | 239/551 |

FOREIGN PATENT DOCUMENTS

| JP | 2004-305955 | 11/2004 |
| JP | 2009-273997 A | 11/2009 |

(Continued)

OTHER PUBLICATIONS

International Search Report from PCT/KR2014/006397 dated Oct. 24, 2014.
(Continued)

*Primary Examiner* — Dah-Wei D Yuan
*Assistant Examiner* — Jethro M Pence
(74) *Attorney, Agent, or Firm* — Dentons US LLP

(57) ABSTRACT

Provided is a slot die coater that applies electrode slurry to metal foil to produce an electrode, the slot die coater including a die part, which includes a body having an inner space receiving the electrode slurry, a supply hole disposed in the body to supply the electrode slurry to the inner space, and a discharge hole disposed in the body to discharge the electrode slurry from the inner space to the metal foil, and a member for the slot die coater, which is removably installed in the inner space to form a slope surface in the inner space, or a movable member for the slot die coater, which selectively forms the slope surface.

11 Claims, 38 Drawing Sheets

(30) Foreign Application Priority Data

Jul. 15, 2014 (KR) .......................... 10-2014-0089034
Jul. 15, 2014 (KR) .......................... 10-2014-0089035

(52) U.S. Cl.
CPC ......... *H01M 4/0409* (2013.01); *H01M 4/139* (2013.01); *H01M 2220/20* (2013.01); *H01M 2220/30* (2013.01)

(56) References Cited

FOREIGN PATENT DOCUMENTS

| | | | | |
|---|---|---|---|---|
| JP | 2010051845 A | 3/2010 | | |
| JP | 2014-188436 A | 10/2014 | | |
| KR | 10-2006-0022432 A | * 9/2007 | ........... | B05C 5/0254 |
| KR | 10-2007-0092384 A | 9/2007 | | |
| KR | 10-1011946 | 1/2011 | | |
| KR | 10-2012-0076853 | 7/2012 | | |
| KR | 10-2012-0126548 | 11/2012 | | |

OTHER PUBLICATIONS

Written Opinion of the ISA from PCT/KR2014/006397 dated Oct. 24, 2014.

\* cited by examiner

MEMBER FOR SLOT DIE COATER, MOVABLE MEMBER FOR SLOT DIE COATER, AND SLOT DIE COATER INCLUDING THE MEMBERS TO PRODUCE ELECTRODE

CROSS-REFERENCE TO RELATED APPLICATIONS

This application is a Continuation Bypass of International Application No. PCT/KR2014/006397, filed Jul. 15, 2014, and claims the benefit of Korean Patent Application No. 10-2013-0083475 filed on Jul. 16, 2013, Korean Application No. 10-2013-0110127 filed on Sep. 13, 2013, Korean Application No. 10-2014-0089034 filed on Jul. 15, 2014, and Korean Application No. 10-2014-0089035 filed on Jul. 15, 2014, all of which are hereby incorporated by reference in their entirety for all purposes as if fully set forth herein.

FIELD OF THE INVENTION

The present invention relates to a member for a slot die coater, a movable member for a slot die coater, and a slot die coater including the members to produce an electrode, and more particularly, to a member for a slot die coater, a movable member for a slot die coater, and a slot die coater including the members to produce an electrode, which decrease a volumetric ratio of a stagnation region in the slot die coater.

DISCUSSION OF RELATED ART

Secondary batteries are rechargeable, unlike primary batteries, and can be miniaturized, and the capacity thereof can be increased. Thus, active research and development are being carried out on secondary batteries. Such secondary batteries may be manufactured by packaging a battery cell into a pack or connecting tens of battery cells in a pack and be widely used in cellular phones and notebook computers, or be used as a power source for driving a motor of electric vehicles.

An electrode of secondary batteries is manufactured by applying electrode slurry, in which an active material and a conducting material are mixed, to metal foil, then, drying the electrode slurry at a high temperature, and then, performing a pressing process. Slot die coaters for producing an electrode are devices for applying electrode slurry to metal foil.

Slot die coaters use a pulse-free pump or a piston pump to supply a liquid fluid having fluidity (such as slurry, a sticking agent, a hard coating agent, or ceramic) between an upper slot die and a lower slot die, the inner parts of which are designed and processed, to coat an object, such as a fabric, a film, a glass plate, or a sheet, with a fluid supplied from a liquid supply pipe such that the object has a constant thickness in a width direction relative to a traveling direction of the object. Slot die coaters for producing an electrode apply electrode slurry, as a fluid to be supplied, to metal foil, thereby forming an electrode of a secondary battery.

Since a flow rate distribution of electrode slurry in a width direction thereof may be changed according to process conditions and the shapes of slot dies, appropriate design of the shapes of parts constituting a slot die coater for producing an electrode is needed to obtain a coating layer having a constant thickness.

Since an active material and a conducting material are mixed with high mass fractions in electrode slurry to reduce a time taken in a drying process and maintain productivity of electrodes, the electrode slurry has a high viscosity. Electrode slurry may stagnate or have a significantly low flow velocity according to the shapes of flow passages in all sections between a mixing tank for storing and supplying the electrode slurry and a slot die coater for producing an electrode.

FIG. 1 is an exploded perspective view illustrating an example of a slot die coater for producing an electrode in the prior art. FIG. 2 is a perspective view illustrating a state in which the slot die coater illustrated in FIG. 1 is assembled. For convenience, a shim illustrated in FIG. 1 is omitted from FIG. 2.

Referring to FIGS. 1 and 2, a slot die coater includes a supply hole 1110 for supplying electrode slurry to the slot die coater. The electrode slurry supplied from the supply hole 1110 is introduced into a body 1130 having an inner space 1140 connected to the supply hole 1110 and receiving the electrode slurry. The body 1130 includes an upper die 1131, a lower die 1133, and a shim 1132 disposed between the upper die 1131 and the lower die 1133 and coupled thereto. The body 1130 is provided with a discharge hole 1150 to discharge the electrode slurry from the inner space 1140 of the body 1130 to the outside. The discharge hole 1150 has a thin and wide shape such that the electrode slurry is widely spread to coat metal foil.

The electrode slurry supplied from the supply hole 1110 is widely spread in the inner space 1140 of the body 1130 in a width direction of the discharge hole 1150, and is then discharged through the discharge hole 1150. The electrode slurry may be discharged with a constant thickness at a constant velocity through the whole of the discharge hole 1150. A die part 1170 of the slot die coater includes the supply hole 1110, the body 1130 having the inner space 1140, and the discharge hole 1150.

When the inner space 1140 of the body 1130 has a rectangular parallelepiped shape, a volumetric ratio of a stagnation region in the slot die coater increases. This is because the electrode slurry easily stagnates at a corner of the inner space 1140 of the body 1130 opposite to the discharge hole 1150. When the electrode slurry stagnates in the slot die coater, particles of an active material or a conducting material included in the electrode slurry are precipitated or accumulated to form an agglomerate that is greater than the particles. When the agglomerate is fitted in a flow passage in the slot die coater or is discharged out of the slot die coater, a coating layer may have an uneven thickness, or a coating defect such as a streak may occur.

SUMMARY OF THE INVENTION

Technical Problem

Accordingly, the present invention aims at providing a member for a slot die coater which prevents electrode slurry from stagnating in the slot die coater, so as to reduce coating defects and maintain flow rates to be uniformly distributed at an outlet of the slot die coater; a movable member for the slot die coater which selectively adjusts a ratio of a stagnation region; and a slot die coater including the members to produce an electrode.

Technical Solution

According to an aspect of the present invention, there is provided a member for a slot die coater, which is removably installed in the slot die coater that applies electrode slurry to metal foil to produce an electrode, the member including a slope surface that guides a flow of the electrode slurry to prevent the electrode slurry from stagnating at a corner in the slot die coater.

According to another aspect of the present invention, there is provided a slot die coater that applies electrode slurry to metal foil to produce an electrode, the slot die coater including: a die part, which includes a body having an inner space receiving the electrode slurry, a supply hole disposed in the body to supply the electrode slurry to the inner space, and a discharge hole disposed in the body to discharge the electrode slurry from the inner space to the metal foil; and a member for the slot die coater, which is removably installed in the inner space to form a slope surface in the inner space, wherein the inner space has a first side surface provided with the discharge hole, a second side surface facing the first side surface, and a third side surface extending from the second side surface to the first side surface, and the slope surface is inclined from the second side surface to the third side surface.

According to another aspect of the present invention, there is provided a movable member for a slot die coater, which is removably installed in the slot die coater that applies electrode slurry to metal foil to produce an electrode, wherein the movable member selectively forms a slope surface that guides a flow of the electrode slurry to prevent the electrode slurry from stagnating at a corner in the slot die coater.

According to another aspect of the present invention, there is provided a slot die coater that applies electrode slurry to metal foil to produce an electrode, the slot die coater including: a die part, which includes a body having an inner space receiving the electrode slurry, a supply hole disposed in the body to supply the electrode slurry to the inner space, and a discharge hole disposed in the body to discharge the electrode slurry from the inner space to the metal foil; and a movable member for the slot die coater, which is removably installed in the inner space to selectively form a slope surface in the inner space, wherein the inner space has a first side surface provided with the discharge hole, a second side surface facing the first side surface, and a third side surface extending from the second side surface to the first side surface, and the slope surface is inclined from the second side surface to the third side surface.

Advantageous Effects

A member for a slot die coater according to the present invention is removably installed in the slot die coater that is used to produce an electrode, and includes a slope surface for guiding a flow of electrode slurry, thereby preventing the electrode slurry from stagnating, so as to reduce coating defects and maintain flow rates to be uniformly distributed at an outlet of the slot die coater.

A slot die coater for producing an electrode according to the present invention includes a slope structure installed therein, thereby preventing electrode slurry from stagnating in the slot die coater, so as to reduce coating defects and maintain flow rates to be uniformly distributed at an outlet of the slot die coater.

A movable member for a slot die coater according to the present invention selectively forms a slope surface for guiding a flow of electrode slurry, thereby preventing the electrode slurry from stagnating in the slot die coater, so as to reduce coating defects, maintain flow rates to be uniformly distributed at an outlet of the slot die coater, and selectively adjust a ratio of a stagnation region.

A slot die coater for producing an electrode according to the present invention includes a movable member for the slot die coater, and the movable member as a slope structure having a movable slope surface is installed in the slot die coater, thereby preventing electrode slurry from stagnating in the slot die coater, so as to reduce coating defects, maintain flow rates to be uniformly distributed at an outlet of the slot die coater, and selectively adjust a ratio of a stagnation region.

DETAILED DESCRIPTION

Hereinafter, preferred embodiments of the present invention will be described in detail with reference to the accompanying drawings. However, the present invention is not limited to the following embodiments.

Embodiment 1

Figure 1:
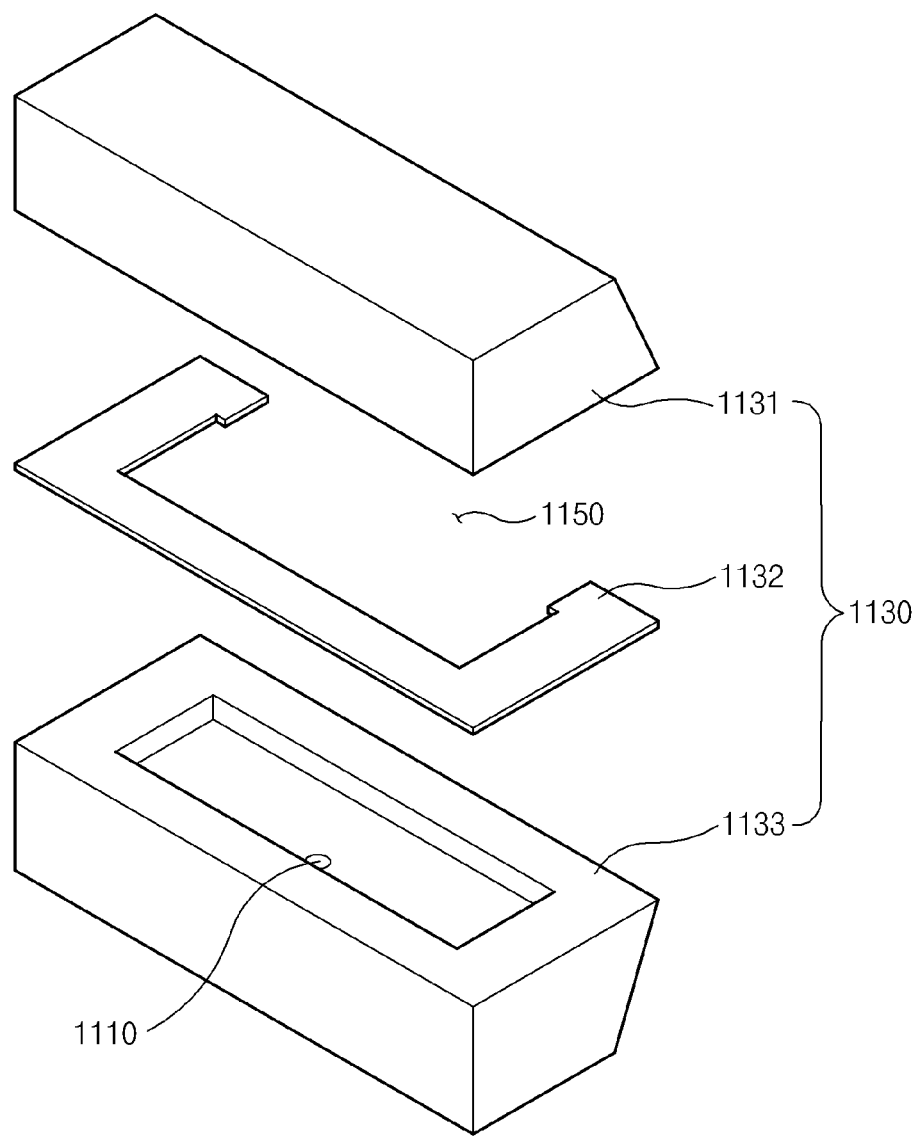
FIG. 1 is an exploded perspective view illustrating an example of a slot die coater for producing an electrode in the prior art.
Figure 2:
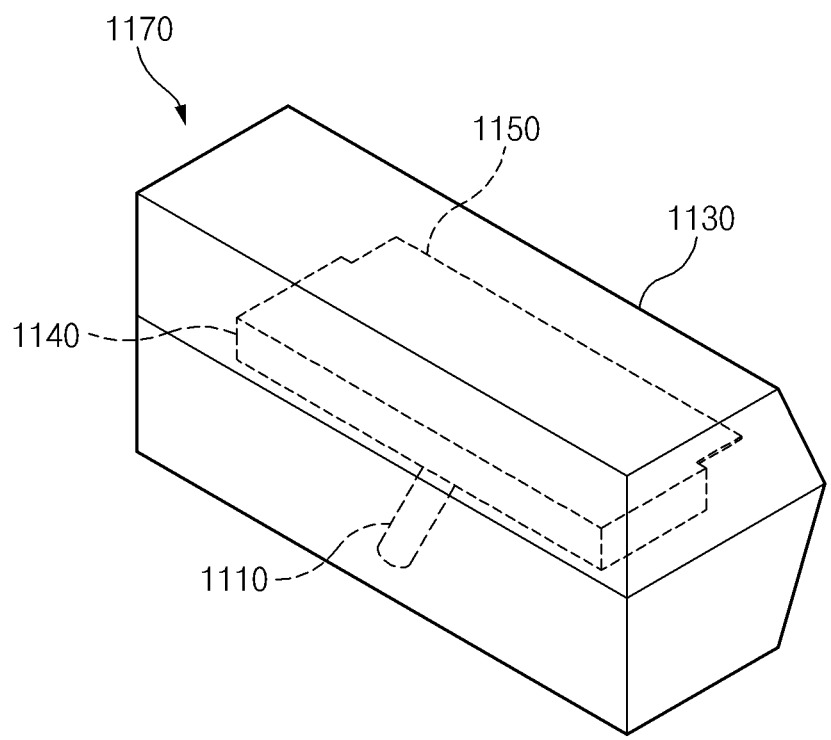
FIG. 2 is a perspective view illustrating a state in which the slot die coater illustrated in FIG. 1 is assembled.
Figure 3:
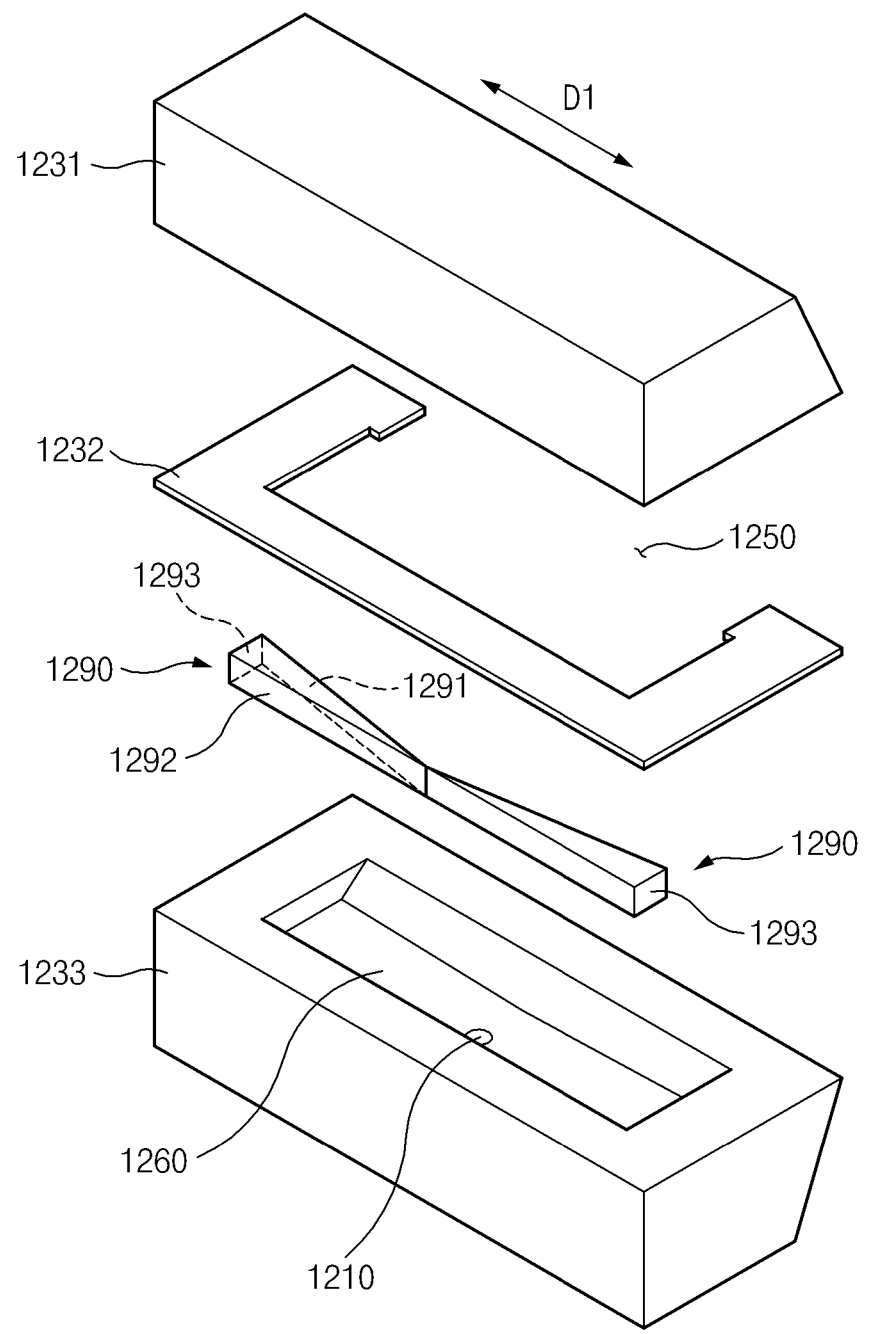
FIG. 3 is an exploded perspective view illustrating a slot die coater for producing an electrode according to a first embodiment of the present invention.
Figure 4:
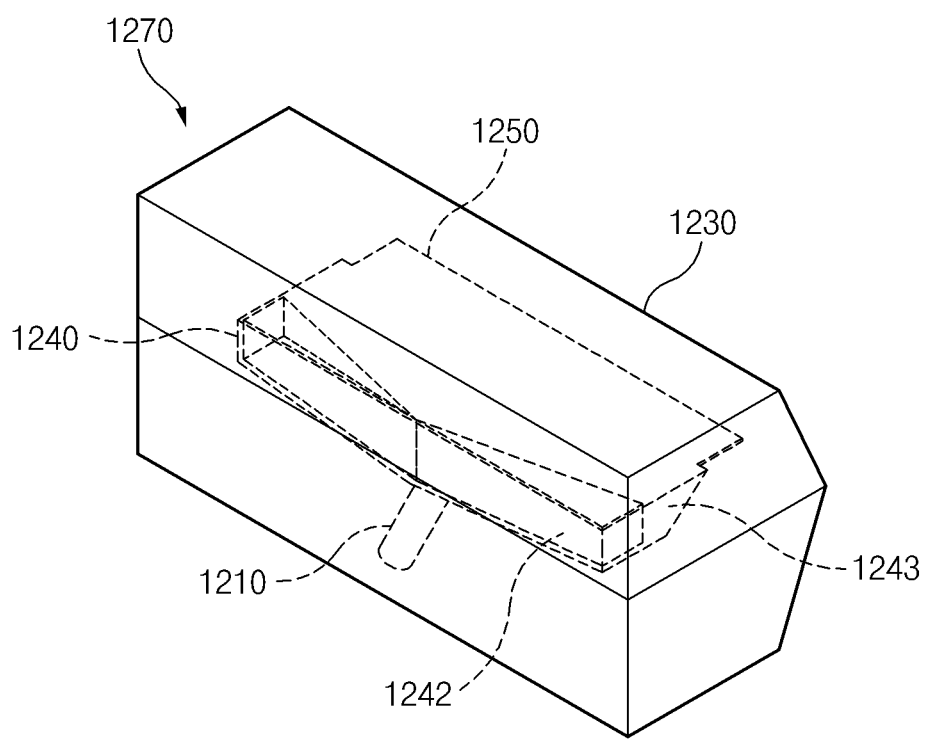
FIG. 4 is a perspective view illustrating a state in which the slot die coater illustrated in FIG. 3 is assembled.
Figure 5:
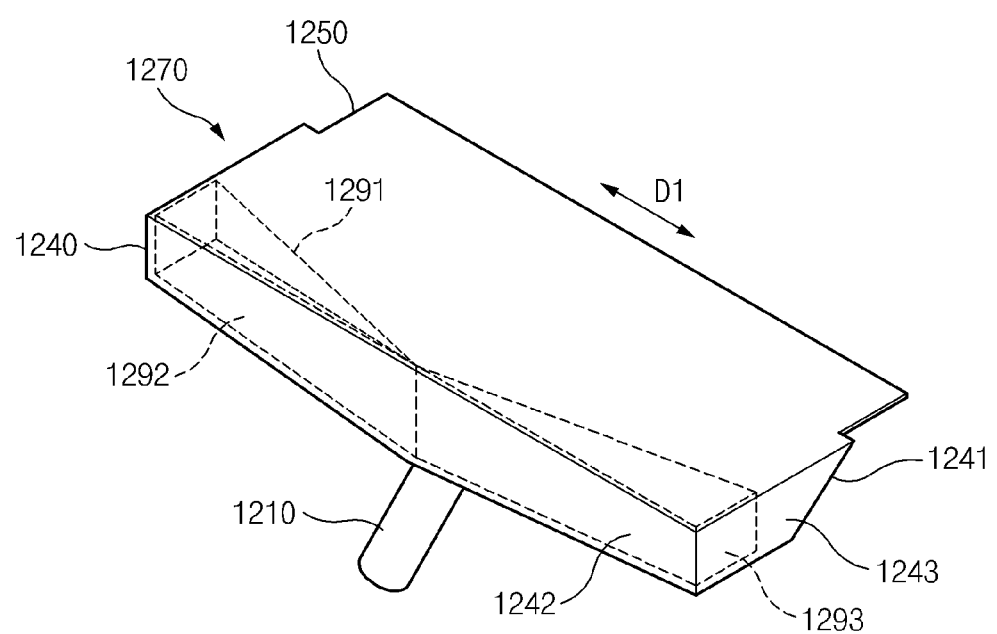
FIG. 5 is a perspective view illustrating only an inner shape of the slot die coater after a member for the slot die coater is installed on the slot die coater illustrated in FIG. 4.
Figure 6:
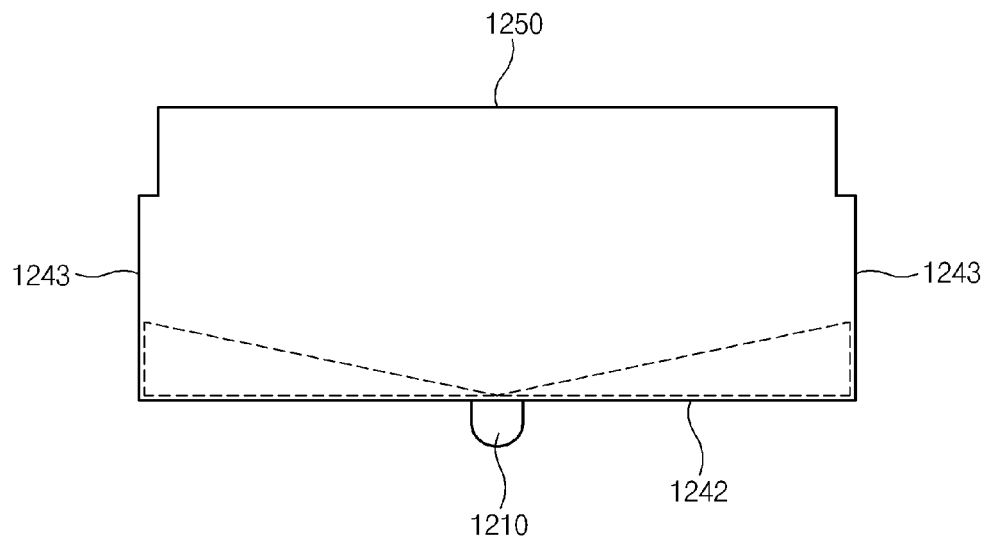
FIG. 6 is a plan view illustrating the inner shape of the slot die coater illustrated in FIG. 5.
Figure 7:
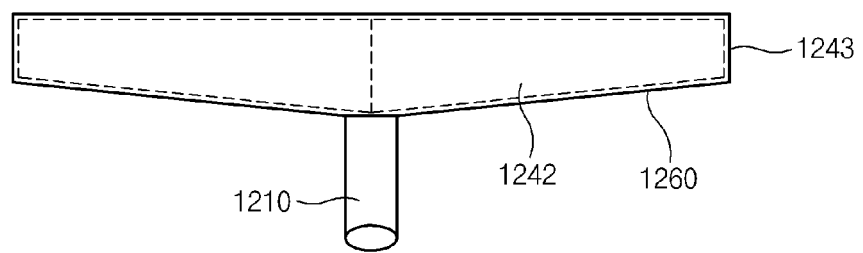
FIG. 7 is a rear view illustrating the inner shape of the slot die coater illustrated in FIG. 5.
Figure 8:
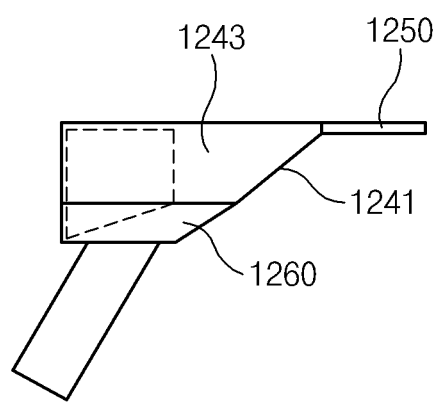
FIG. 8 is a side view illustrating the inner shape of the slot die coater illustrated in FIG. 5.

FIG. 3 is an exploded perspective view illustrating a slot die coater for producing an electrode according to a first embodiment of the present invention. FIG. 4 is a perspective view illustrating a state in which the slot die coater illustrated in FIG. 3 is assembled. For convenience, a shim illustrated in FIG. 3 is omitted from FIG. 4. FIG. 5 is a perspective view illustrating only an inner shape of the slot die coater after a member for the slot die coater is installed on the slot die coater illustrated in FIG. 4. FIG. 6 is a plan view illustrating the inner shape of the slot die coater illustrated in FIG. 5. FIG. 7 is a rear view illustrating the inner shape of the slot die coater illustrated in FIG. 5. FIG. 8 is a side view illustrating the inner shape of the slot die coater illustrated in FIG. 5. Referring to FIGS. 3 to 8, a slot die coater for producing an electrode will now be described in detail according to the first embodiment.

Referring to FIGS. 3 to 5, the slot die coater includes: a supply hole 1210 for supplying electrode slurry to the slot die coater; a body 1230 having an inner space 1240 connected to the supply hole 1210 and receiving the electrode slurry; and a discharge hole 1250 for discharging the electrode slurry from the body 1230 to external metal foil, as described in BACKGROUND ART. The discharge hole 1250 has a thin and wide shape such that the electrode slurry is widely spread to coat the metal foil. The electrode slurry supplied from the supply hole 1210 is widely spread in the inner space 1240 of the body 1230 in a width direction of the discharge hole 1250, and is then discharged through the discharge hole 1250. The electrode slurry may be discharged with a constant thickness at a constant velocity through the whole of the discharge hole 1250. A die part 1270 of the slot die coater includes the supply hole 1210, the body 1230, and the discharge hole 1250. Referring to FIGS. 3 and 5, the slot die coater further includes a member 1290 for the slot die coater, which is removably installed in the inner space 1240 of the body 1230 to form a slope surface in the inner space 1240. That is, the member 1290 includes a slope surface for guiding a flow of the electrode slurry in the inner space 1240. The slope surface may guide the flow of the electrode slurry to prevent the electrode slurry from stagnating at an inner corner of the slot die coater. As such, the member 1290 may reduce a region where the electrode slurry stagnates in the inner space 1240 of the body 1230.

The inner space 1240 of the body 1230 includes a first side surface 1241, a second side surface 1242, and a third side surface 1243. The first side surface 1241, which constitutes the inner space 1240 of the body 1230, is provided with the discharge hole 1250. That is, the first side surface 1241 is provided with an outlet that is connected to the discharge hole 1250 to discharge the electrode slurry to the outside from the inner space 1240 of the body 1230. Even when the inner space 1240 of the body 1230 does not have a rectangular parallelepiped shape, the first side surface 1241 may be determined in the same manner. The first side surface 1241 is a surface of the inner space 1240 connected to the discharge hole 1250. The second side surface 1242 is a surface of the inner space 1240 facing the first side surface 1241. That is, the second side surface 1242 is opposite to the first side surface 1241. The supply hole 1210 may not be connected to the second side surface 1242 as illustrated in FIG. 5. The second side surface 1242 is determined regardless of the supply hole 1210. The second side surface 1242 is determined relative to the first side surface 1241. The third side surface 1243 extends from the second side surface 1242 to the first side surface 1241. The third side surface 1243 is selected from the surfaces of the inner space 1240 except for the upper and lower surfaces thereof. When lateral surfaces of the inner space 1240 are referred to as side surfaces of the inner space 1240, the third side surface 1243 is selected from the side surfaces. The third side surface 1243 may be provided in plurality. Two or more side surfaces may be provided as the third side surfaces 1243.

FIG. 3 illustrates a method of installing the member 1290 in the inner space 1240 of the body 1230. According to the method, an upper die 1231 and a lower die 1233 into which the body 1230 is divided are decoupled from each other, then, the member 1290 is inserted in the inner space 1240 of the body 1230, and then, the upper die 1231 and the lower die 1233 are coupled to each other. Accordingly, the member 1290 is installed in the inner space 1240. On the contrary, the member 1290 may be removed from the slot die coater by removing the member 1290 from the inner space 1240.

Referring to FIGS. 5 to 8, the slope surface of the member 1290 is inclined from the second side surface 1242 to the third side surface 1243. The member 1290 reduces a stagnation region where the electrode slurry stagnates at a corner formed by the second and third side surfaces 1242 and 1243 of the inner space 1240 of the body 1230. The electrode slurry is guided to the discharge hole 1250 along the slope surface, thereby preventing the electrode slurry from stagnating at the corner between the second and third side surfaces 1242 and 1243 of the inner space 1240. If the electrode slurry flows to the corner between the second and third side surfaces 1242 and 1243, a moving distance of the electrode slurry is increased, and an amount and force of the electrode slurry surging from the rear side thereof are decreased. Accordingly, the electrode slurry stagnates at the corner. Thus, the slope surface fundamentally prevents the electrode slurry from flowing to the corner between the second and third side surfaces 1242 and 1243, thereby eliminating the stagnation region. In this case, a region through which the member 1290 is inserted, or a gap between coupled portions of the upper die 1231, a shim 1232, and the lower die 1233 may be sealed to prevent the electrode slurry from leaking through the region or the gap.

The member 1290 may be disposed at only one of corners between the second side surface 1242 and the third side surfaces 1243, or members 1290 may be disposed at the left and right sides of the supply hole 1210, respectively. Even when the member 1290 is disposed at only one of the corners, a ratio of a stagnation region is reduced. However, when the members 1290 are disposed at the left and right sides of the supply hole 1210, a stagnation region is more effectively reduced.

The member 1290 may be a three dimensional structure, which includes a first surface 1291 as a slope surface, a second surface 1292 corresponding to the second side surface 1242 and supported thereby, and a third surface 1293 corresponding to the third side surface 1243 and supported thereby. Specifically, the members 1290 illustrated in FIG. 3 are structures having a triangular prism shape. In this case, the first surface 1291, the second surface 1292, and the third surface 1293 form the side surfaces of the triangular prism shape, respectively. The first surface 1291 of the member 1290 forms a slope surface. The second surface 1292 of the member 1290 contacts the second side surface 1242 of the inner space 1240. The third surface 1293 of the member 1290 contacts the third side surface 1243 of the inner space 1240. A cross section of the member 1290 parallel to the upper die 1231 has a triangular shape.

When the member 1290 has a triangular prism shape, the second surface 1292 of the member 1290 extends from an end of the first surface 1291 of the member 1290, and the third surface 1293 of the member 1290 extends from another of the first surface 1291 of the member 1290 to the second surface 1292 of the member 1290. Thus, the first to third surfaces 1291, 1292, and 1293 form the three side surfaces of the member 1290 having the triangular prism shape. The second and third surfaces 1292 and 1293 contact each other to form a corner that corresponds to the corner between the second and third side surfaces 1242 and 1243. The corner of the member 1290 as a triangular structure corresponds to the corner of the inner space 1240 and is thus more stably supported thereby. In addition, the corner of the member 1290 is firmly fixed to prevent the electrode slurry from leaking through a gap.

However, the member 1290 is not limited to the triangular structure. A cross section of the member 1290 may have any figure other than a triangle, provided that the member 1290 includes first to third surfaces. Although a member is a structure having a tetragonal prism shape, the member is within the scope of the present invention, provided that the member includes a first surface as a slope surface, a second surface corresponding to the second side surface 1242 and supported thereby, and a third surface corresponding to the third side surface 1243 and supported thereby.

Referring to FIGS. 3, 7, and 8, an inner lower surface 1260 constituting the inner space 1240 of the body 1230 is gradually upwardly inclined to the outside of the inner space 1240 from a location connected to the supply hole 1210. Accordingly, an angle formed between the third side surface 1243 and the inner lower surface 1260 of the inner space 1240 of the body 1230 is increased. If the angle formed between the third side surface 1243 and the inner lower surface 1260 is small, the electrode slurry may stagnate at the corner between the third side surface 1243 and the inner lower surface 1260. The electrode slurry is more smoothly moved upward at the corner between the third side surface 1243 and the inner lower surface 1260 by increasing the angle formed between the third side surface 1243 and the inner lower surface 1260. Accordingly, the stagnation of the electrode slurry is reduced.

A decrease in volumetric ratio of a stagnation region according to the size of the member 1290 may be numerically expressed. When the inner space 1240 of the body 1230 is cut along a plane perpendicular to a width direction D1 of the discharge hole 1250, a cross section extending from the slope surface of the member 1290 to the first side surface 1241 is formed. When the area of the formed cross section is referred to as a vertical cross sectional area, a decrease in stagnation region according to installation of the member 1290 based on the size thereof may be determined based on a ratio of the vertical cross sectional area. Specific cases will now be described according to results of experiments performed based on the ratio of the vertical cross sectional area.

Case 1>

Figure 9:
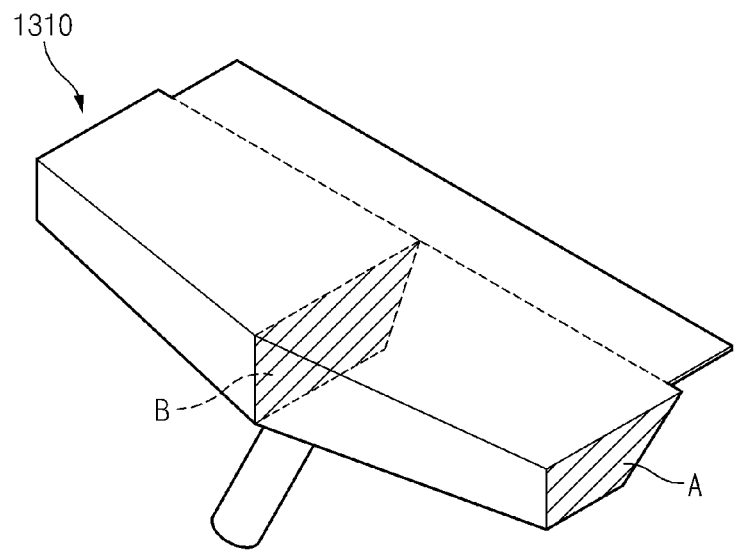
FIG. 9 is a perspective view illustrating the rest of an inner shape of a slot die coater, except for a portion taken by members for the slot die coater after the members are installed.
Figure 10:
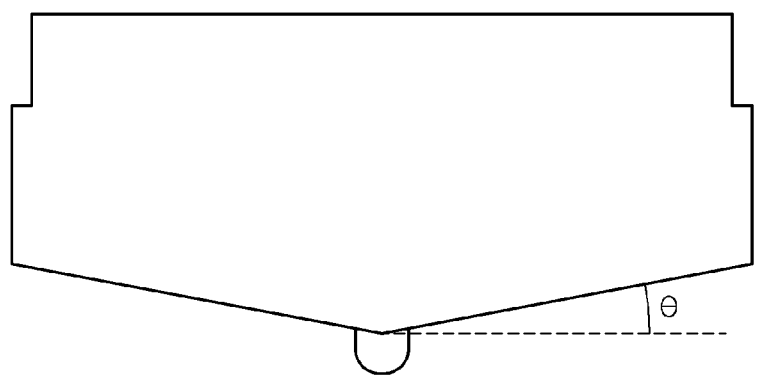
FIG. 10 is a plan view illustrating the rest of the inner shape of FIG. 9.

FIG. 9 is a perspective view illustrating the rest of an inner shape of a slot die coater, except for a portion taken by members for the slot die coater after the members are installed. FIG. 10 is a plan view illustrating the rest of the inner shape of FIG. 9.

Referring to FIGS. 9 and 10, when the formed cross section is closest to the third side surface 1243 of the inner space 1240 of the body 1230 in a shape 1310 illustrated in FIG. 9, the area of the formed cross section is referred to as a vertical cross sectional area A. In addition, when the formed cross section is closest to the central part of the inner space 1240 of the body 1230, the area of the formed cross section is referred to as a vertical cross sectional area B. A first case is a result of an experiment on a slot die coater for producing an electrode in which the vertical cross sectional area A is 53.7% of the vertical cross sectional area B. In this case, the first surface 1291 of the member 1290, which is a slope surface, forms an angle of 2.8 degrees with the second side surface 1242 (that is, θ of FIG. 10 is 2.8 degrees).

Figure 11:
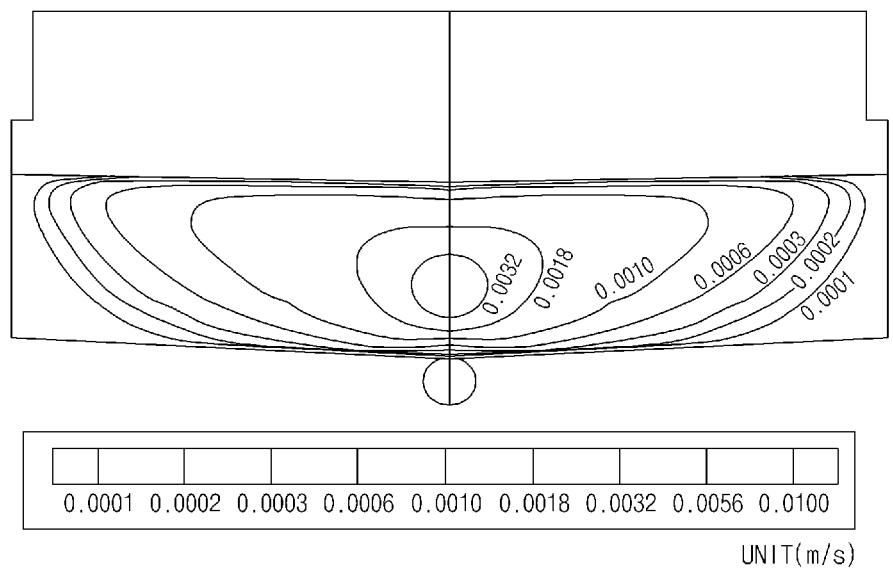
FIG. 11 is a graph illustrating a distribution of flow velocities in an inner space of a slot die coater in a first case.

In addition, a volumetric ratio of a stagnation region where the electrode slurry has a flow velocity of 0.1 mm/s or lower) is 9.78% (the total volume of the shape 1310 is 591. 4 mL, and the volume of the stagnation region is 57.8 mL). When the first case is compared with a fourth case to be described later, as a comparative example in which the member 1290 is not provided, the volumetric ratio of the stagnation region is decreased from 11.18% to 9.78%. FIG. 11 is a graph illustrating a distribution of flow velocities in an inner space of the slot die coater in the first case. A stagnation region and a velocity distribution can be analyzed with reference to iso-velocity lines.

A standard deviation to mean ratio of outlet flow rate at the discharge hole 1250 in the first case is 1.90%. 1.90% is close to 1.89% that is a standard deviation to mean ratio of outlet flow rate in the fourth case to be described later, as a comparative example in which the member 1290 is not provided. This means that a distribution of flow rates in the width direction D1 of the discharge hole 1250 is substantially constant, regardless of whether the member 1290 is provided or not. That is, flow rates at the discharge hole 1250 are maintained to be uniformly distributed, and the stagnation region in the body 1230 is reduced.

Case 2>

Figure 12:
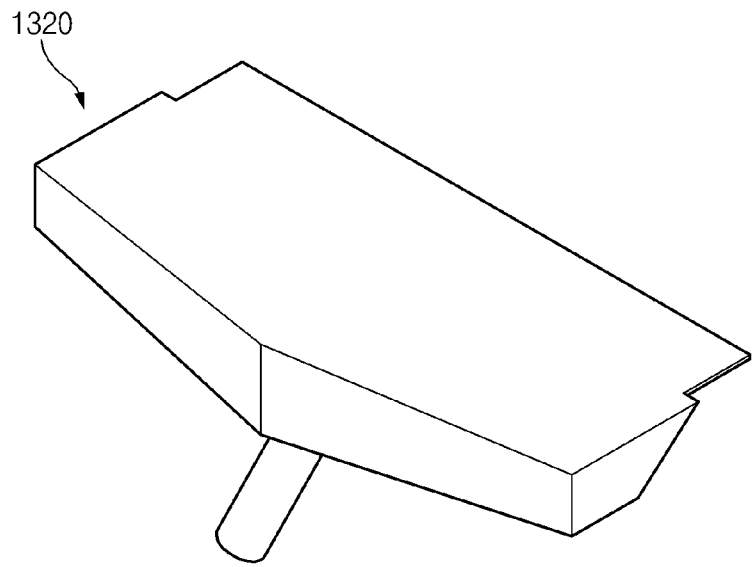
FIG. 12 is a perspective view illustrating the rest of an inner shape of a slot die coater, except for a portion taken by members for the slot die coater after the members are installed.
Figure 13:
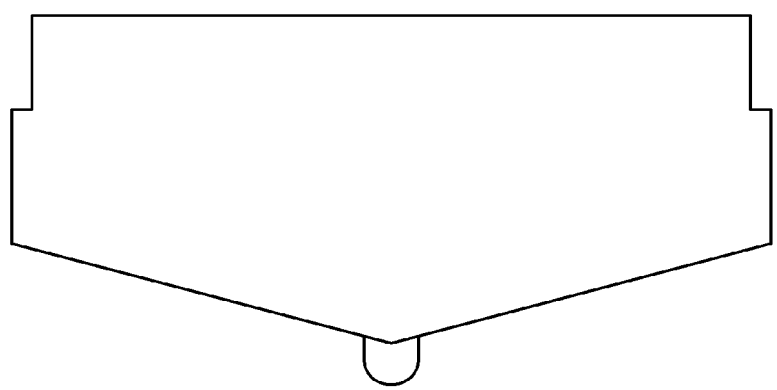
FIG. 13 is a plan view illustrating the rest of the inner shape of FIG. 12.

FIG. 12 is a perspective view illustrating the rest of an inner shape of a slot die coater, except for a portion taken by members for the slot die coater after the members are installed. FIG. 13 is a plan view illustrating the rest of the inner shape of FIG. 12.

Referring to FIGS. 12 and 13, when the formed cross section is closest to the third side surface 1243 of the inner space 1240 of the body 1230 in a shape 1320 illustrated in FIG. 12, the area of the formed cross section is referred to as a vertical cross sectional area A. In addition, when the formed cross section is closest to the central part of the inner space 1240 of the body 1230, the area of the formed cross section is referred to as a vertical cross sectional area B. A second case is a result of an experiment on a slot die coater for producing an electrode in which the vertical cross sectional area A is 38.4% of the vertical cross sectional area B. In this case, the first surface 1291 of the member 1290, which is a slope surface, forms an angle of 8.5 degrees with the second side surface 1242.

Figure 14:
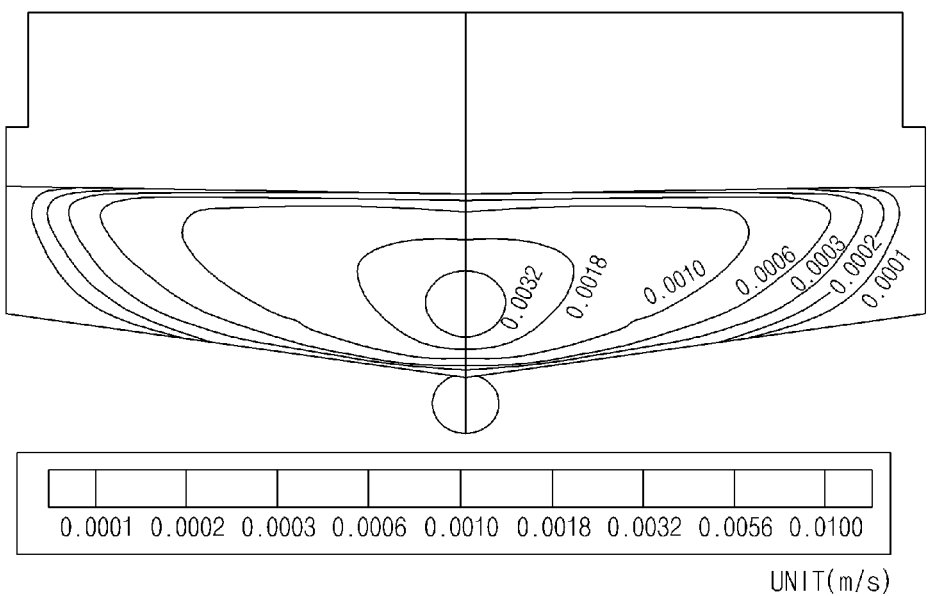
FIG. 14 is a graph illustrating a distribution of flow velocities in an inner space of a slot die coater in a second case.

In addition, a volumetric ratio of a stagnation region where the electrode slurry has a flow velocity of 0.1 mm/s or lower) is 7.48% (the total volume of the shape 1320 is 535.7 mL, and the volume of the stagnation region is 40.1 mL). When the second case is compared with the fourth case to be described later, as a comparative example in which the member 1290 is not provided, the volumetric ratio of the stagnation region is decreased from 11.18% to 7.48%. FIG. 14 is a graph illustrating a distribution of flow velocities in an inner space of the slot die coater in the second case. A stagnation region and a velocity distribution can be analyzed with reference to iso-velocity lines.

A standard deviation to mean ratio of outlet flow rate at the discharge hole 1250 in the second case is 1.93%. 1.93% is close to 1.89% that is a standard deviation to mean ratio of outlet flow rate in the fourth case to be described later, as a comparative example in which the member 1290 is not provided. This means that a distribution of flow rates in the width direction D1 of the discharge hole 1250 is substantially constant, regardless of whether the member 1290 is provided or not. That is, flow rates at the discharge hole 1250 are maintained to be uniformly distributed, and the stagnation region in the body 1230 is further reduced.

Case 3>

Figure 15:
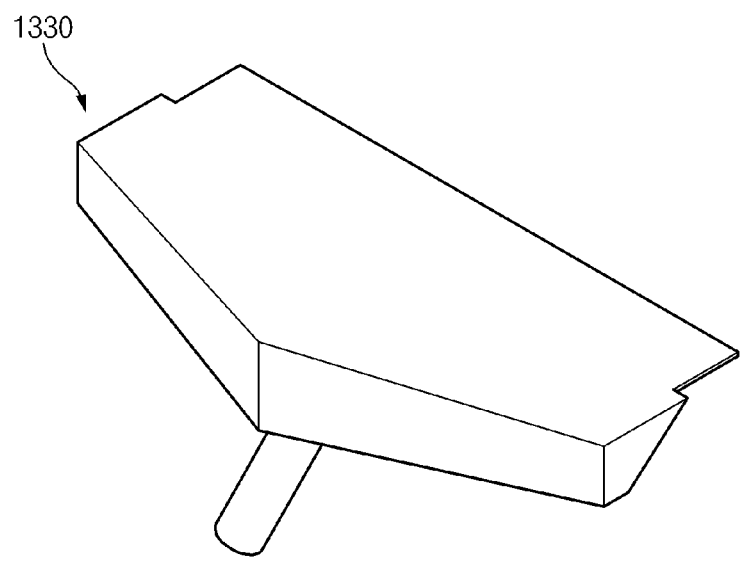
FIG. 15 is a perspective view illustrating the rest of an inner shape of a slot die coater, except for a portion taken by members for the slot die coater after the members are installed.
Figure 16:
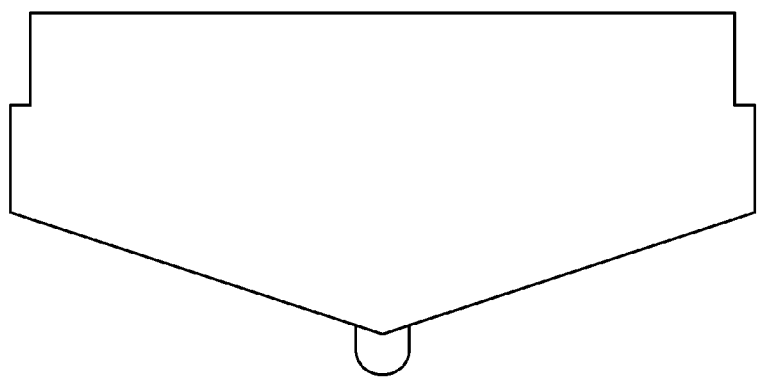
FIG. 16 is a plan view illustrating the rest of the inner shape of FIG. 15.

FIG. 15 is a perspective view illustrating the rest of an inner shape of a slot die coater, except for a portion taken by members for the slot die coater after the members are installed. FIG. 16 is a plan view illustrating the rest of the inner shape of FIG. 15.

Referring to FIGS. 15 and 16, when the formed cross section is closest to the third side surface 1243 of the inner space 1240 of the body 1230 in a shape 1330 illustrated in FIG. 15, the area of the formed cross section is referred to as a vertical cross sectional area A. In addition, when the formed cross section is closest to the central part of the inner space 1240 of the body 1230, the area of the formed cross section is referred to as a vertical cross sectional area B. A third case is a result of an experiment on a slot die coater for producing an electrode in which the vertical cross sectional area A is 23.0% of the vertical cross sectional area B. In this case, the first surface 1291 of the member 1290, which is a slope surface, forms an angle of 16.7 degrees with the second side surface 1242.

Figure 17:
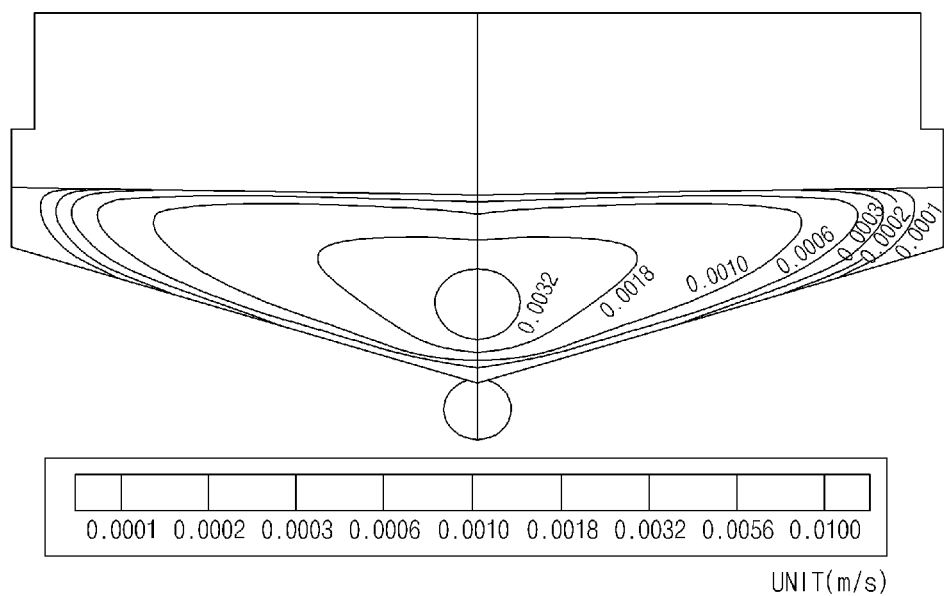
FIG. 17 is a graph illustrating a distribution of flow velocities in an inner space of a slot die coater in a third case.

In addition, a volumetric ratio of a stagnation region where the electrode slurry has a flow velocity of 0.1 mm/s or lower) is 4.81% (the total volume of the shape 1330 is 452.1 mL, and the volume of the stagnation region is 21.7 mL). When the third case is compared with the fourth case to be described later, as a comparative example in which the member 1290 is not provided, the volumetric ratio of the stagnation region is decreased from 11.18% to 4.81%. FIG. 17 is a graph illustrating a distribution of flow rates in an inner space of the slot die coater in the third case. A stagnation region and a velocity distribution can be analyzed with reference to iso-velocity lines.

A standard deviation to mean ratio of outlet flow rate at the discharge hole 1250 in the third case is 2.03%. 2.03% is close to 1.89% that is a standard deviation to mean ratio of outlet flow rate in the fourth case to be described later, as a comparative example in which the member 1290 is not provided. This means that a distribution of flow rates in the width direction D1 of the discharge hole 1250 is substantially constant, regardless of whether the member 1290 is provided or not. That is, flow rates at the discharge hole 1250 are maintained to be uniformly distributed, and the stagnation region in the body 1230 is significantly reduced.

Case 4>

Figure 18:
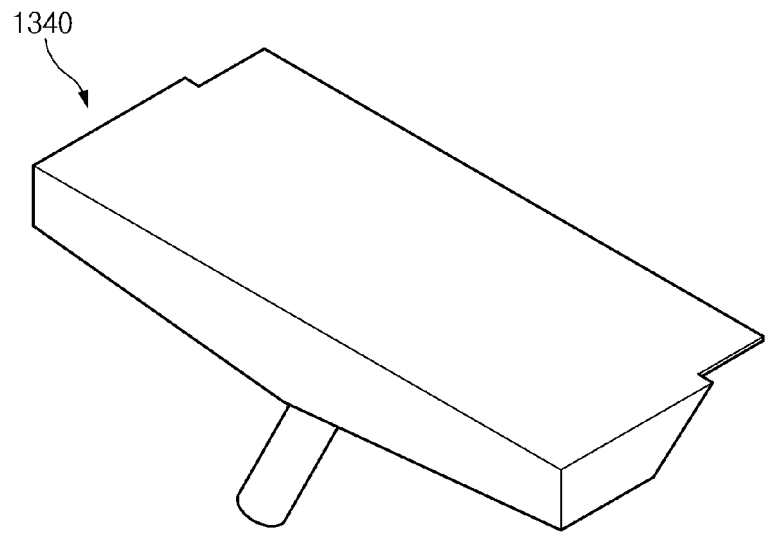
FIG. 18 is a perspective view illustrating an inner shape of a slot die coater without a member for the slot die coater.
Figure 19:
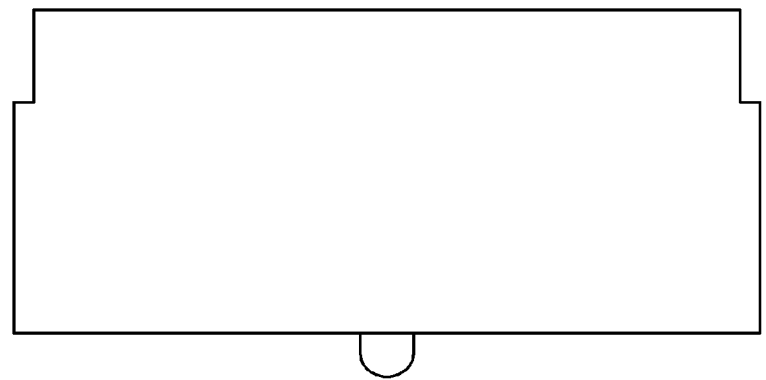
FIG. 19 is a plan view illustrating the rest of the inner shape of FIG. 18.

FIG. 18 is a perspective view illustrating an inner shape of a slot die coater without a member for the slot die coater. FIG. 19 is a plan view illustrating the inner shape of FIG. 18.

Figure 20:
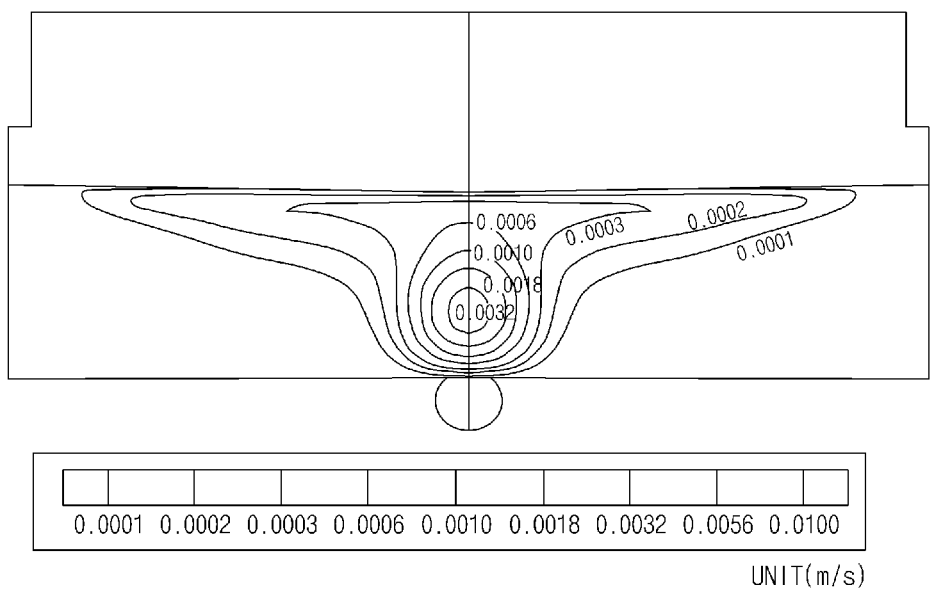
FIG. 20 is a graph illustrating a distribution of flow velocities in an inner space of a slot die coater in a fourth case.

Referring to FIGS. 18 and 19, the fourth case is a result of an experiment on a case in which the member 1290 is not installed in the inner space 1240 of the body 1230. Since the member 1290 is not provided, the fourth case is a comparative example. In the fourth case, a volumetric ratio of a stagnation region where the electrode slurry has a flow velocity of 0.1 mm/s or lower) is 11.18% (the total volume of an inner shape of a slot die coater is 619.3 mL, and the volume of the stagnation region is 69.2 mL). FIG. 20 is a graph illustrating a distribution of flow velocities in an inner space of the slot die coater in the fourth case. A stagnation region and a velocity distribution can be analyzed with reference to iso-velocity lines. A standard deviation to mean ratio of outlet flow rate at the discharge hole 1250 is 1.89%.

Case 5>

Figure 21:
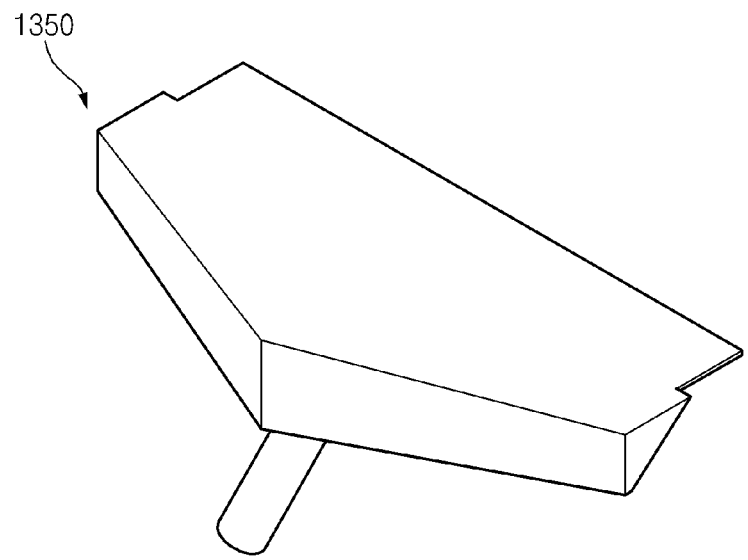
FIG. 21 is a perspective view illustrating the rest of an inner shape of a slot die coater, except for a portion taken by members for the slot die coater after the members are installed.
Figure 22:
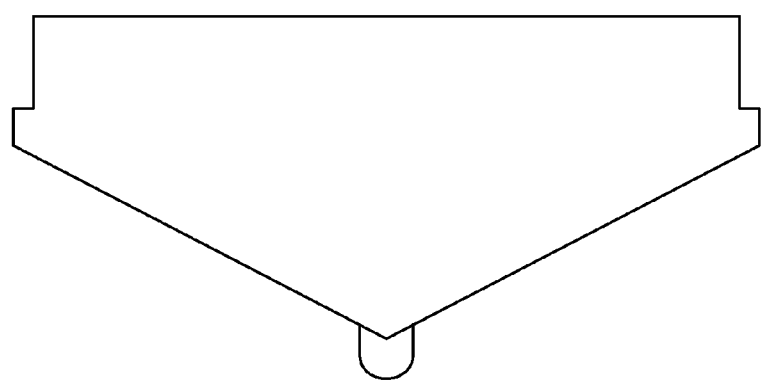
FIG. 22 is a plan view illustrating the rest of the inner shape of FIG. 21.

FIG. 21 is a perspective view illustrating the rest of an inner shape of a slot die coater, except for a portion taken by members for the slot die coater after the members are installed. FIG. 22 is a plan view illustrating the rest of the inner shape of FIG. 21.

Referring to FIGS. 21 and 22, when the formed cross section is closest to the third side surface 1243 of the inner space 1240 of the body 1230 in a shape 1350 illustrated in FIG. 21, the area of the formed cross section is referred to as a vertical cross sectional area A. In addition, when the formed cross section is closest to the central part of the inner space 1240 of the body 1230, the area of the formed cross section is referred to as a vertical cross sectional area B. A fifth case is a result of an experiment on a slot die coater for producing an electrode in which the vertical cross sectional area A is 10.7% of the vertical cross sectional area B. In this case, the first surface 1291 of the member 1290, which is a slope surface, forms an angle of 21.8 degrees with the second side surface 1242.

Figure 23:
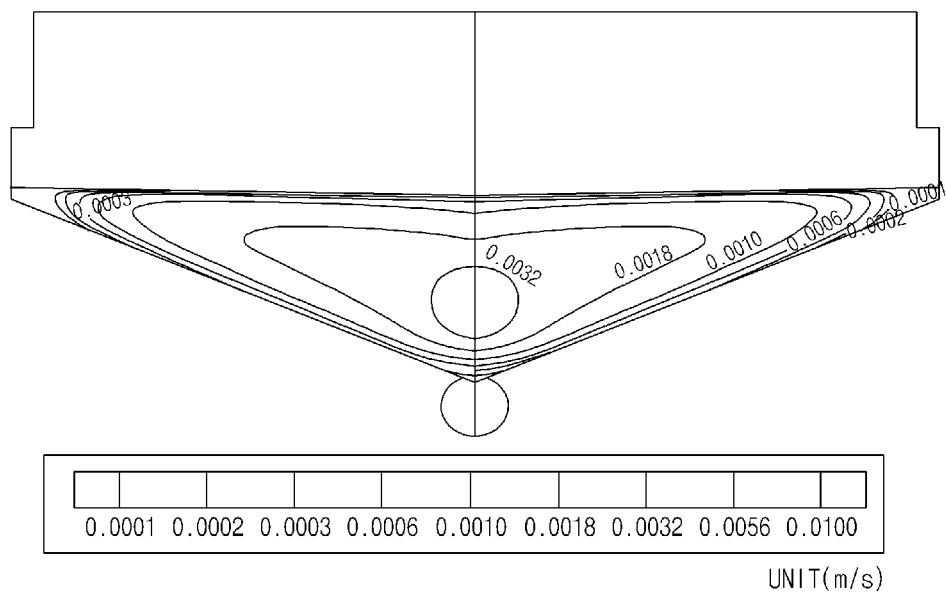
FIG. 23 is a graph illustrating a distribution of flow velocities in an inner space of a slot die coater in a fifth case.

In addition, a volumetric ratio of a stagnation region where the electrode slurry has a flow velocity of 0.1 mm/s or lower) is 3.78% (the total volume of the shape 1350 is 396.3 mL, and the volume of the stagnation region is 15.0 mL). When the fifth case is compared with the fourth case, as a comparative example in which the member 1290 is not provided, the volumetric ratio of the stagnation region is decreased from 11.18% to 3.78%. FIG. 23 is a graph illustrating a distribution of flow velocities in an inner space of the slot die coater in the fifth case. A stagnation region and a velocity distribution can be analyzed with reference to iso-velocity lines.

A standard deviation to mean ratio of outlet flow rate at the discharge hole 1250 in the fifth case is 2.19%. 2.19% is different from 1.89% that is a standard deviation to mean ratio of outlet flow rate in the fourth case as a comparative example in which the member 1290 is not provided. This means that a difference between the outlet flow rate in the center of the discharge hole 1250 and the outlet flow rate in a side portion thereof is equal to or greater than an allowable reference value. Thus, when the electrode slurry is applied to the metal foil, thickness uniformity of the electrode slurry is equal to or smaller than a reference value. As a result, although the member 1290 of the fifth case decreases the volume of the stagnation region, a deviation of the outlet flow rates is increased to degrade a coating quality.

Figure 24:
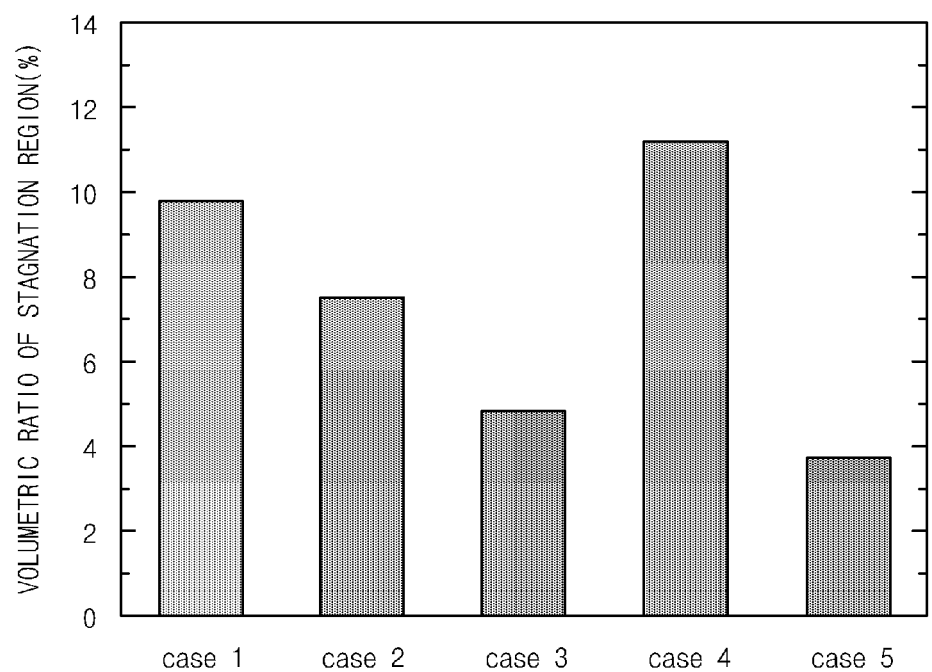
FIG. 24 is a bar graph illustrating volumetric ratios of stagnation regions in the first to fifth cases.

FIG. 24 is a bar graph illustrating the volumetric ratios of the stagnation regions in the first to fifth cases. As described above, the volumetric ratios in the first to fifth cases have 9.78%, 7.48%, 4.81%, 11.18%, and 3.78%, respectively. The volumetric ratios decrease in order from the first case to fifth case, except for the fourth case as a comparative example. Thus, as the ratio of the vertical cross sectional area A to the vertical cross sectional area B of the member 1290 decreases, the volumetric ratio of the stagnation region decreases. The volumetric ratio of the stagnation region most significantly decreases in the fifth case in which the ratio of the vertical cross sectional area A to the vertical cross sectional area B is smallest.

Figure 25:
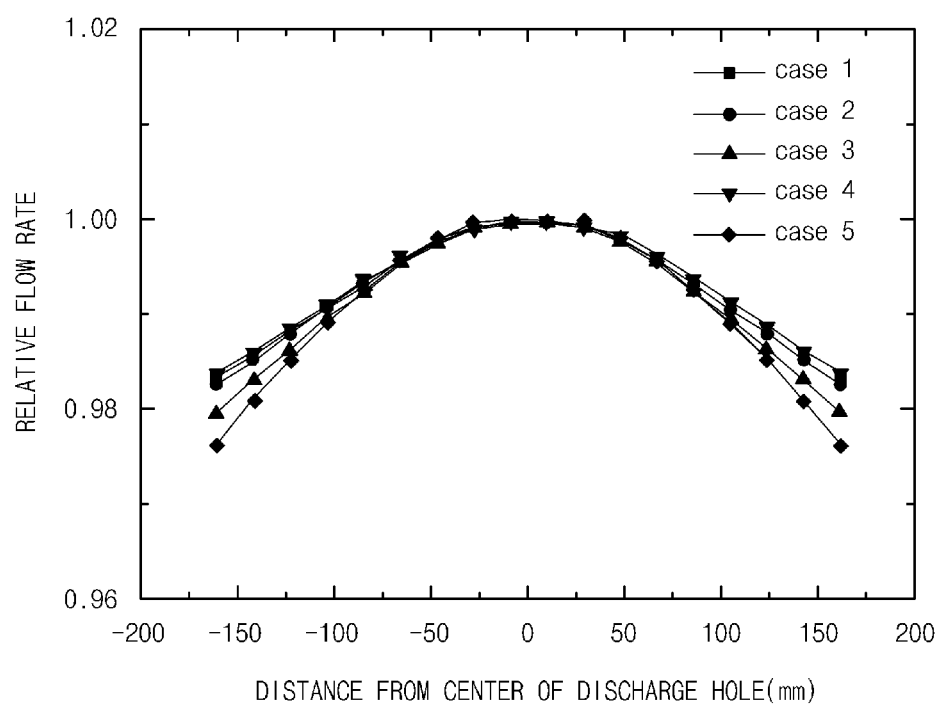
FIG. 25 is a graph illustrating outlet flow rates distributed according to distances from the center of a discharge hole in each of the first to fifth cases.

FIG. 25 is a graph illustrating outlet flow rates distributed in the width direction of the discharge hole 1250 from the center thereof in the first to fifth cases. Referring to FIG. 25, flow rate distributions of the first and second cases are substantially the same as that of the fourth graph in which the member 1290 is not provided. A flow rate distribution of the third case, in which the vertical cross sectional area A is 23.0% of the vertical cross sectional area B, is substantially similar to that of the fourth case. This means that distributions of outlet flow rates in the first to third cases in which the member 1290 is provided are not significantly different from a distribution of outlet flow rates in the fourth case in which the member 1290 is not provided. That is, the first to third cases are not significantly degraded in terms of uniformity in coating thickness. However, a deviation of flow rates in the fifth case is significantly greater than a deviation of flow rates in the fourth case. The standard deviation to mean ratio of outlet flow rate at the discharge hole 1250 in the fifth case is 2.19%, and thus, a deviation of outlet flow rates of slurry in the fifth case exceeds an allowable quality reference value. As a result, although the member 1290 of the fifth case decreases the volume of the stagnation region, the deviation of the outlet flow rates is increased to degrade the coating quality.

To sum up, when the inner space 1240 is cut along planes perpendicular to a first direction as the width direction D1 of the discharge hole 1250, cross sections extending from the slope surface to the first side surface 1241 are formed. When a slope structure is installed in a slot die coater for producing an electrode such that a ratio of the area of the extending cross section closest to the third side surface 1243 to the area of the extending cross section closest to the central part of the inner space 1240 ranges from 23.0% to 53.7%, that is, a ratio of the vertical cross sectional area A to the vertical cross sectional area B ranges from 23.0% to 53.7%, electrode slurry is prevented from stagnating in the slot die coater, so as to reduce coating defects and maintain flow rates to be uniformly distributed at an outlet of the slot die coater.

In addition, a method using an angle may be provided as a method of numerically expressing a decrease in volumetric ratio of a stagnation region according to the size of the member 1290. To sum up the results of the experiments of the first to fifth cases, when the slope surface of the member 1290 forms an angle ranging from 2.8 to 16.7 degrees with the second side surface 1242 of the body 1230, the stagnation region of the electrode slurry in the slot die coater is decreased, so as to reduce coating defects and maintain flow rates to be uniformly distributed at the outlet of the slot die coater.

Embodiment 2

Figure 26:
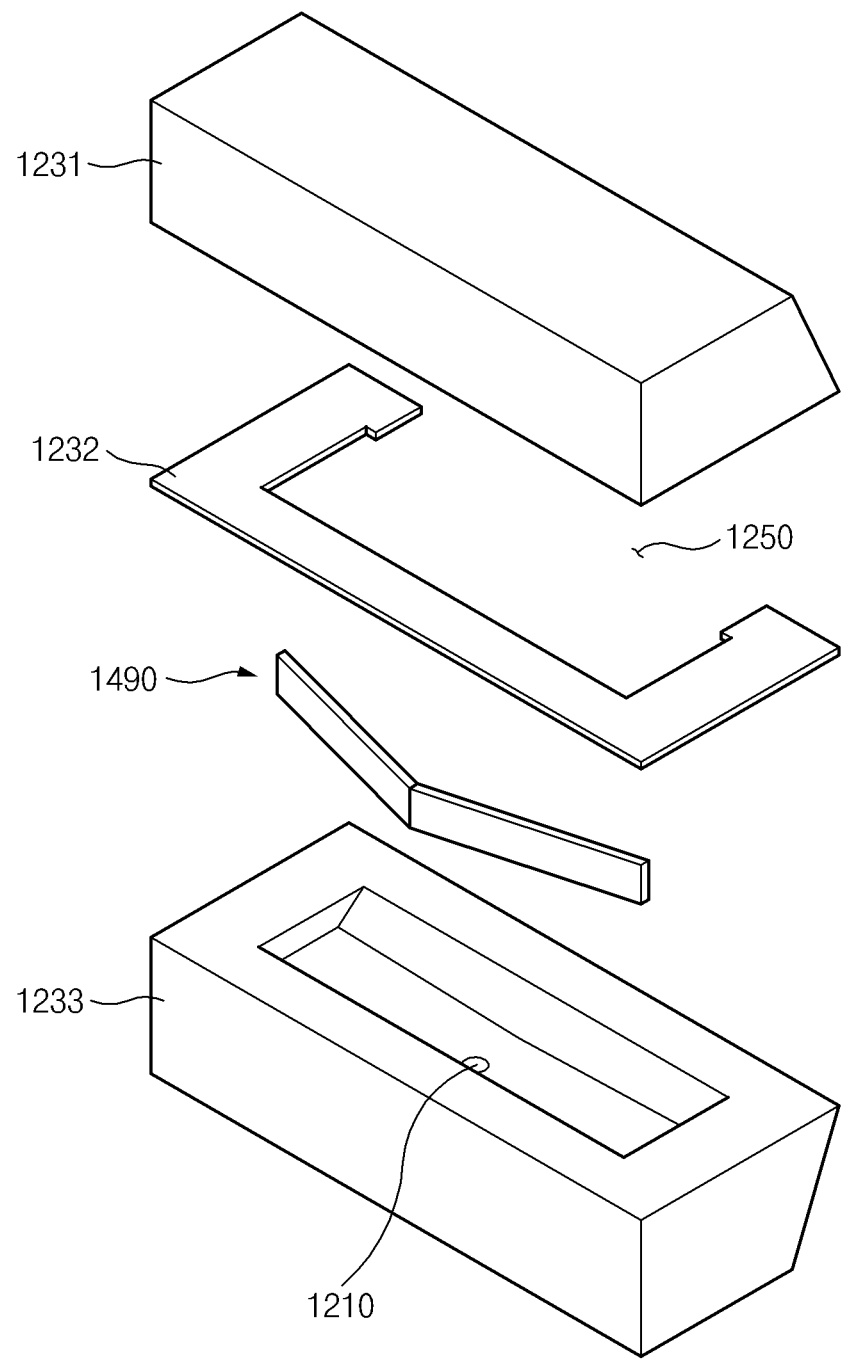
FIG. 26 is an exploded perspective view illustrating a slot die coater for producing an electrode according to a second embodiment of the present invention.
Figure 27:
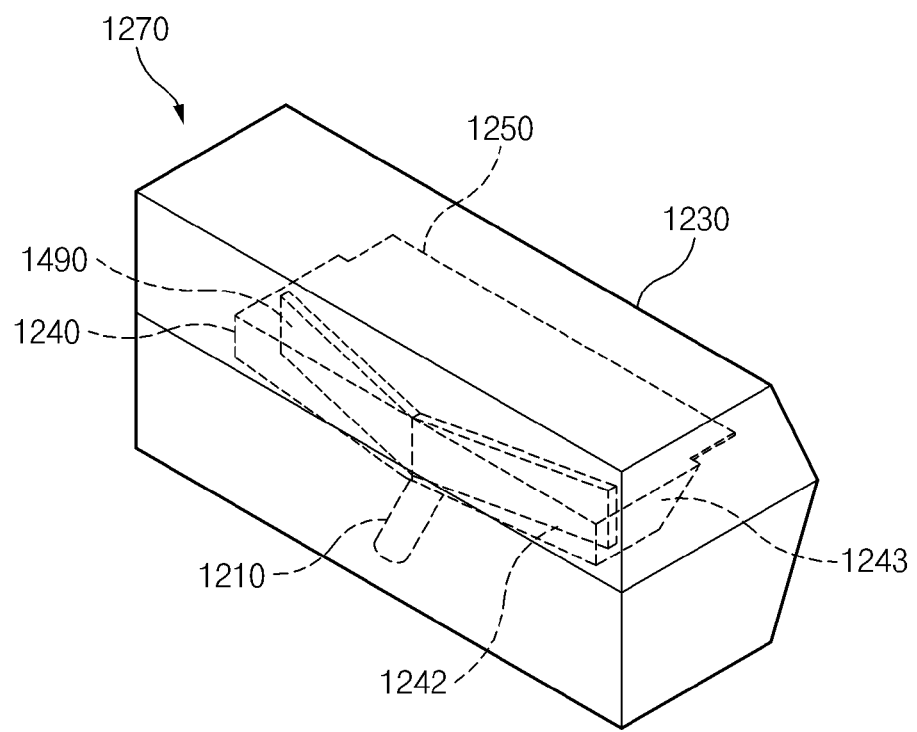
FIG. 27 is a perspective view illustrating a state in which the slot die coater illustrated in FIG. 26 is assembled.

FIG. 26 is an exploded perspective view illustrating a slot die coater for producing an electrode according to a second embodiment of the present invention. FIG. 27 is a perspective view illustrating a state in which the slot die coater illustrated in FIG. 26 is assembled. For convenience, a shim illustrated in FIG. 26 is omitted from FIG. 27. A slot die coater for producing an electrode according to the current embodiment has a configuration similar to that of a slot die coater for producing an electrode according to the first embodiment. However, the second embodiment is different from the first embodiment in that a plate structure is provided as a member 1490 for a slot die coater. Parts, which are the same as (or correspond to) the previously-described parts, are denoted by the same (or corresponding) reference numerals, and a detailed description thereof will be omitted.

Referring to FIGS. 26 and 27, a slot die coater for producing an electrode according to the second embodiment includes the member 1490 having a plate shape, an end of which is supported by the second side surface 1242 of the inner space 1240 of the body 1230, and another end of which is supported by the third side surface 1243 of the inner space 1240 of the body 1230. A slope surface the member 1490, which is inclined from the second side surface 1242 to the third side surface 1243, is formed by the plate shape, not by a triangular structure. The member 1490 having the plate shape reduces a stagnation region of electrode slurry generated at the corner formed by the second side surface 1242 and the third side surface 1243 of the inner space 1240. The electrode slurry is guided to the discharge hole 1250 along the slope surface formed by the plate shape, thereby preventing the electrode slurry from stagnating at the corner between the second and third side surfaces 1242 and 1243 of the inner space 1240. Although the member 1490 having the plate shape is formed of a small amount of material, the member 1490 has an effect similar to an effect of a member having a triangular structure.

Embodiment 3

Figure 28:
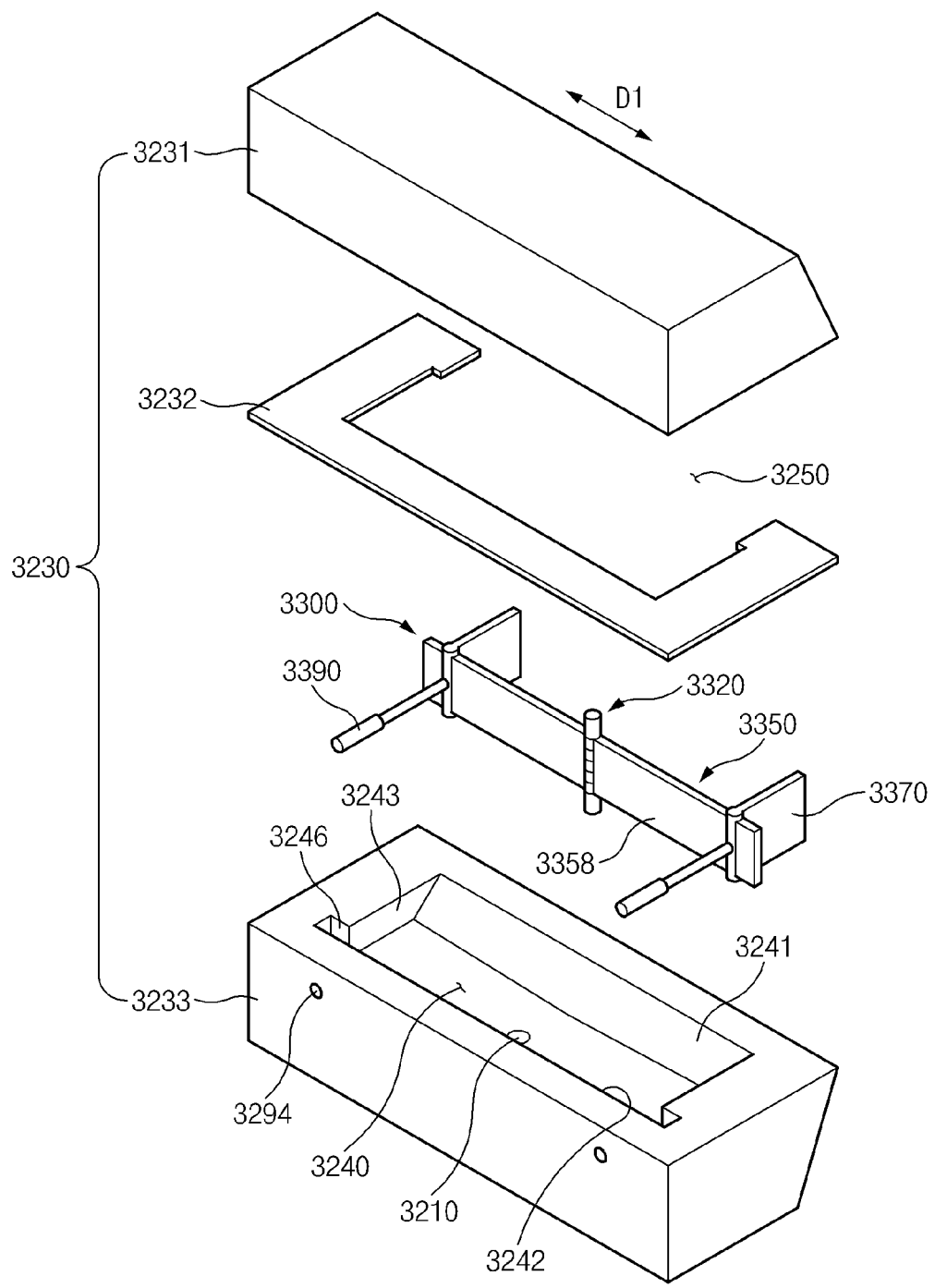
FIG. 28 is an exploded perspective view illustrating a slot die coater for producing an electrode according to a third embodiment of the present invention.
Figure 29:
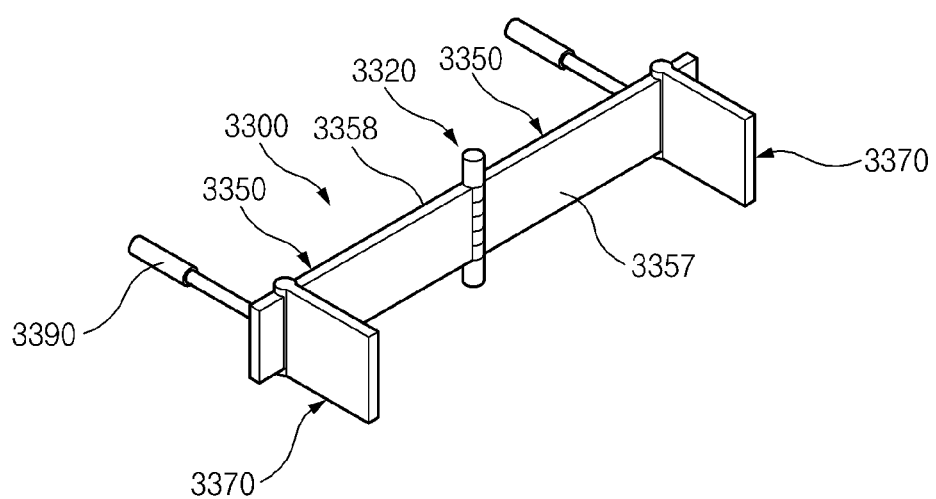
FIG. 29 is a perspective view illustrating only a movable member for the slot die coater illustrated in FIG. 28, which is installed in the slot die coater.
Figure 30:
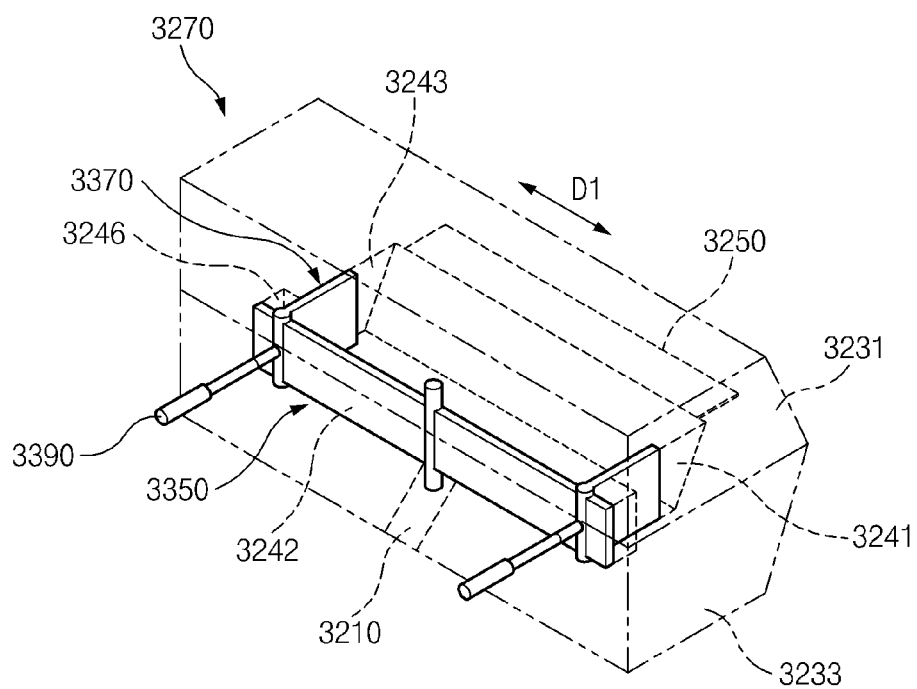
FIG. 30 is a perspective view illustrating a state in which the slot die coater illustrated in FIG. 28 is assembled.
Figure 31:
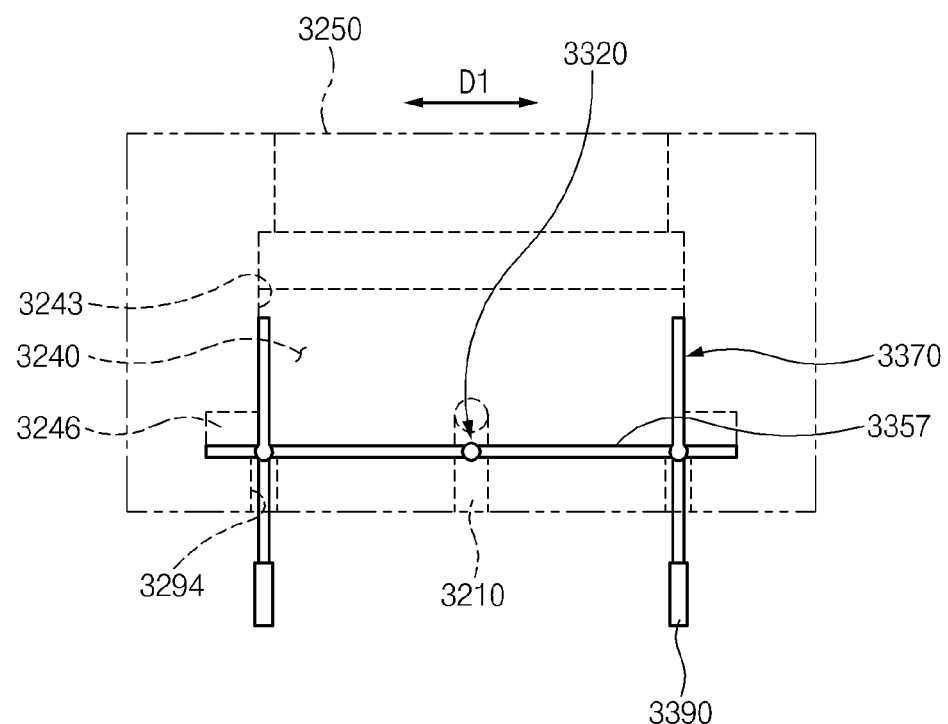
FIG. 31 is a plan view illustrating the slot die coater of FIG. 30.
Figure 32:
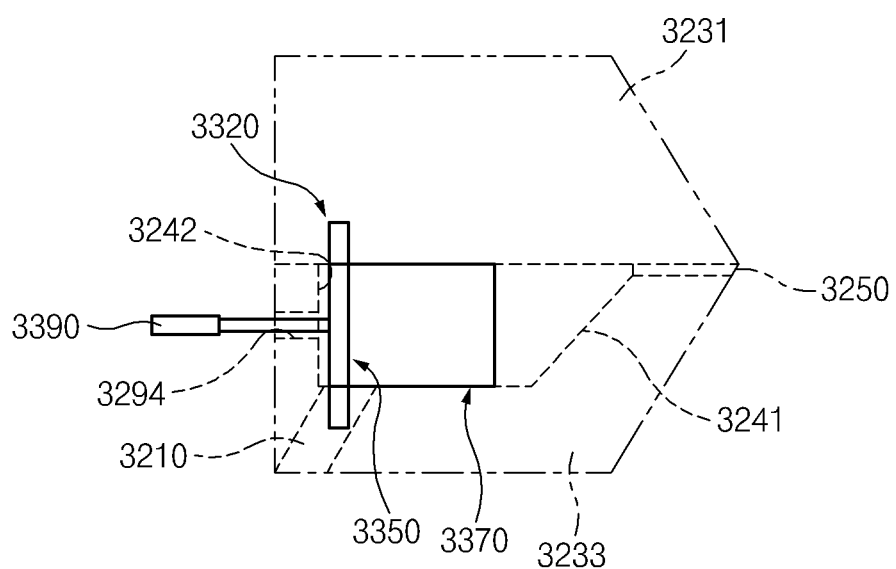
FIG. 32 is a side view illustrating the slot die coater of FIG. 30.
Figure 33:
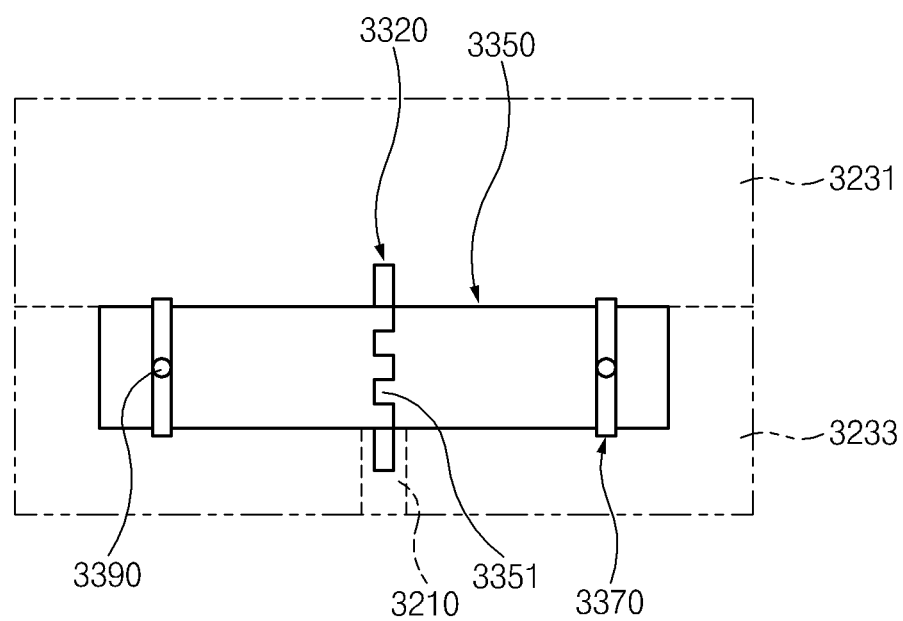
FIG. 33 is a bottom view illustrating the slot die coater of FIG. 30.

FIG. 28 is an exploded perspective view illustrating a slot die coater for producing an electrode according to a third embodiment of the present invention. FIG. 29 is a perspective view illustrating only a movable member for the slot die coater illustrated in FIG. 28, which is installed in the slot die coater. FIG. 30 is a perspective view illustrating a state in which the slot die coater illustrated in FIG. 28 is assembled. For convenience, a shim illustrated in FIG. 28 is omitted from FIG. 30. FIG. 31 is a plan view illustrating the slot die coater of FIG. 30. FIG. 32 is a side view illustrating the slot die coater of FIG. 30. FIG. 33 is a bottom view illustrating the slot die coater of FIG. 30.

Referring to FIGS. 28 to 33, a slot die coater for producing an electrode will now be described according to the third embodiment.

The slot die coater according to the third embodiment includes: a supply hole 3210 for supplying electrode slurry to the slot die coater; a body 3230 having an inner space 3240 connected to the supply hole 3210 and receiving the electrode slurry; and a discharge hole 3250 for discharging the electrode slurry from the body 3230 to external metal foil, as described in BACKGROUND ART. The body 3230 includes an upper die 3231, a shim 3232, and a lower die 3233. The discharge hole 3250 has a thin and wide shape such that the electrode slurry is widely spread to coat the metal foil. The electrode slurry supplied from the supply hole 3210 is widely spread in the inner space 3240 of the body 3230 in a width direction D1 of the discharge hole 3250, and is then discharged through the discharge hole 3250. The electrode slurry may be discharged with a constant thickness at a constant velocity through the whole of the discharge hole 3250. A die part 3270 of the slot die coater includes the supply hole 3210, the body 3230, and the discharge hole 3250. The slot die coater further includes a movable member 3300 for the slot die coater, which is removably installed in the inner space 3240 of the body 3230 to selectively form a slope surface in the inner space 3240. The movable member 3300 includes a slope surface for guiding a flow of the electrode slurry in the inner space 3240. The slope surface may guide the flow of the electrode slurry to prevent the electrode slurry from stagnating at an inner corner of the slot die coater.

As such, the movable member 3300 may reduce a region where the electrode slurry stagnates in the inner space 3240 of the body 3230.

Referring to FIGS. 28, 30, 31, and 32, the inner space 3240 of the body 3230 includes a first side surface 3241, a second side surface 3242, and third side surfaces 3243. The first side surface 3241, which constitutes the inner space 3240 of the body 3230, is provided with the discharge hole 3250. That is, the first side surface 3241 is provided with an outlet that is provided with the discharge hole 3250 to discharge the electrode slurry to the outside from the inner space 3240 of the body 3230. Even when the inner space 3240 of the body 3230 does not have a rectangular parallelepiped shape, the first side surface 3241 may be determined in the same manner. The first side surface 3241 is a surface of the inner space 3240 connected to the discharge hole 3250.

The second side surface 3242 is a surface of the inner space 3240 facing the first side surface 3241. That is, the second side surface 3242 is opposite to the first side surface 3241.

The third side surfaces 3243 extend from the second side surface 3242 to the first side surface 3241. The third side surfaces 3243 are selected from the surfaces of the inner space 3240 except for the upper and lower surfaces thereof. When lateral surfaces of the inner space 3240 are referred to as side surfaces of the inner space 3240, the third side surfaces 3243 are selected from the side surfaces.

FIG. 28 illustrates a method of installing the movable member 3300 in the inner space 3240 of the body 3230. According to the method, the upper die 3231 and the lower die 3233 into which the body 3230 is divided are decoupled from each other, then, the movable member 3300 is inserted in the inner space 3240 of the body 3230, and then, the upper die 3231 and the lower die 3233 are coupled to each other. At this point, handle members 3390 protrude from the inner space 3240 to the outside of the upper die 3231 and the lower die 3233 through guide holes 3294 formed in the lower die 3233. Lateral spaces 3246, in which ends of back plate members 3350 of the movable member 3300 are movably inserted, are formed in the lower die 3233.

The movable member 3300 may be installed in the inner space 3240. On the contrary, the movable member 3300 may be removed from the slot die coater by removing the movable member 3300 from the inner space 3240.

The movable member 3300 includes a column member 3320, the back plate members 3350, the lateral plate members 3370, and the handle members 3390. The column member 3320 is fixed to the body 3230 and is thus prevented from moving, e.g., rotating or linearly moving. The back plate members 3350 are rotatable about the column member 3320. An end of the back plate members 3350 is rotatably coupled to the column member 3320, and another end thereof extends to the third side surface 3243.

The back plate members 3350 have a plate shape with a front surface 3357 and a rear surface 3358. However, the back plate members 3350 are not limited to the plate shape. When the back plate members 3350 rotate about the column member 3320, the front surfaces 3357 of the back plate members 3350 form slope surfaces directed from the second side surface 3242 to the third side surfaces 3243. In this case, the flow of the electrode slurry is guided by the front surfaces 3357 of the back plate members 3350.

One of the back plate members 3350 may be provided at only one side of the column member 3320, or the back plate members 3350 may be provided at both sides thereof. Thus, one of the slope surfaces formed by the front surfaces 3357 of the back plate members 3350 may be provided at only one side of the column member 3320, or the slope surfaces may be provided at both sides thereof. Even when one of the slope surfaces is provided at only one side of the column member 3320, the stagnation of the electrode slurry in the inner space 3240 is reduced. However, the slope surfaces provided at both the sides of the column member 3320 further reduce the stagnation of the electrode slurry.

The column member 3320 may be installed to correspond to the location of the supply hole 3210. In this case, the slope surfaces are formed at both sides of the supply hole 3210. In this case, the inner space 3240 may have a symmetrical shape. Thus, the electrode slurry can be more uniformly discharged through the discharge hole 3250.

An end of the lateral plate members 3370 is rotatably coupled to the back plate member 3370, and another end thereof extends to the discharge hole 3250 (a discharge direction in which the electrode slurry is discharged). The lateral plate members 3370 are located to contact the third side surfaces 3243. Thus, the lateral plate members 3370 move along the third side surfaces 3243. The lateral plate members 3370 may move to the discharge hole 3250 or move away therefrom.

The movable member 3300 includes the handle members 3390 to conveniently move the lateral plate members 3370. An end of the handle members 3390 is connected to the lateral plate member 3370, and another end thereof extends to the second side surface 3242 (in a direction opposite to the discharge direction of the electrode slurry). The second end of the handle members 3390 extend to the outside through the guide holes 3294 formed in the lower die 3233. Thus, the movable member 3300 disposed in the inner space 3240 can be controlled even at the outside of the upper die 3231 and the lower die 3233.

The handle members 3390 linearly move through the guide holes 3294 formed in the lower die 3233. When the handle members 3390 are pushed to the discharge hole 3250, the lateral plate members 3370 are also moved to the discharge hole 3250. Since the first ends of the handle members 3390 are connected to the lateral plate members 3370, a movement amount of the handle members 3390 corresponds to a movement amount of the lateral plate members 3370.

Figure 34:
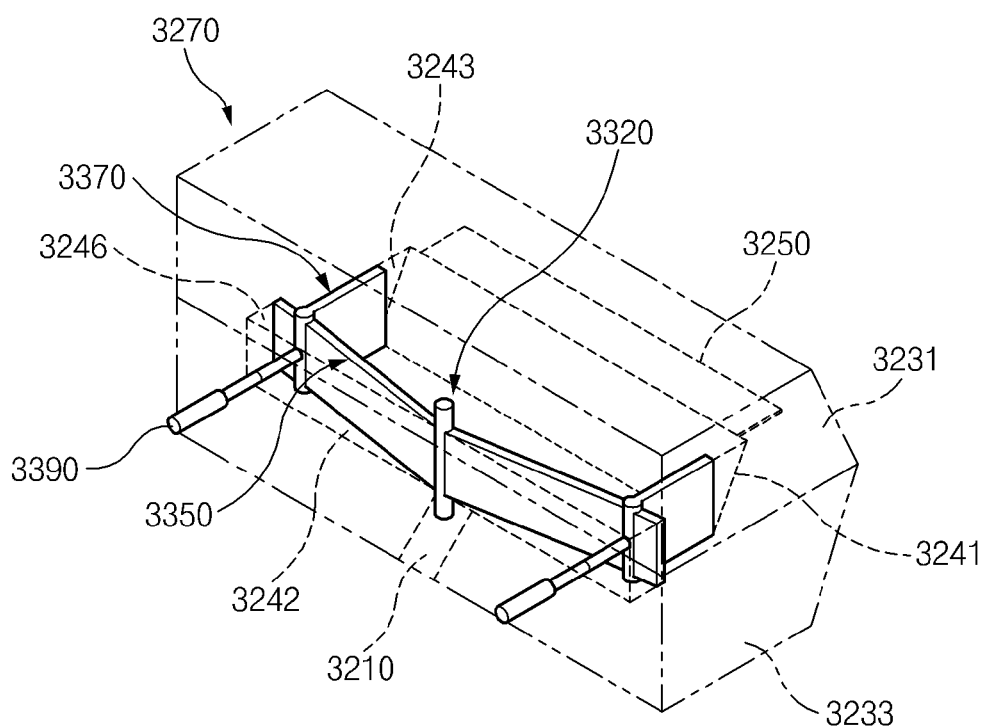
FIG. 34 is a perspective view illustrating a case in which slope surfaces are formed by the movable member of the slot die coater illustrated in FIG. 30.
Figure 35:
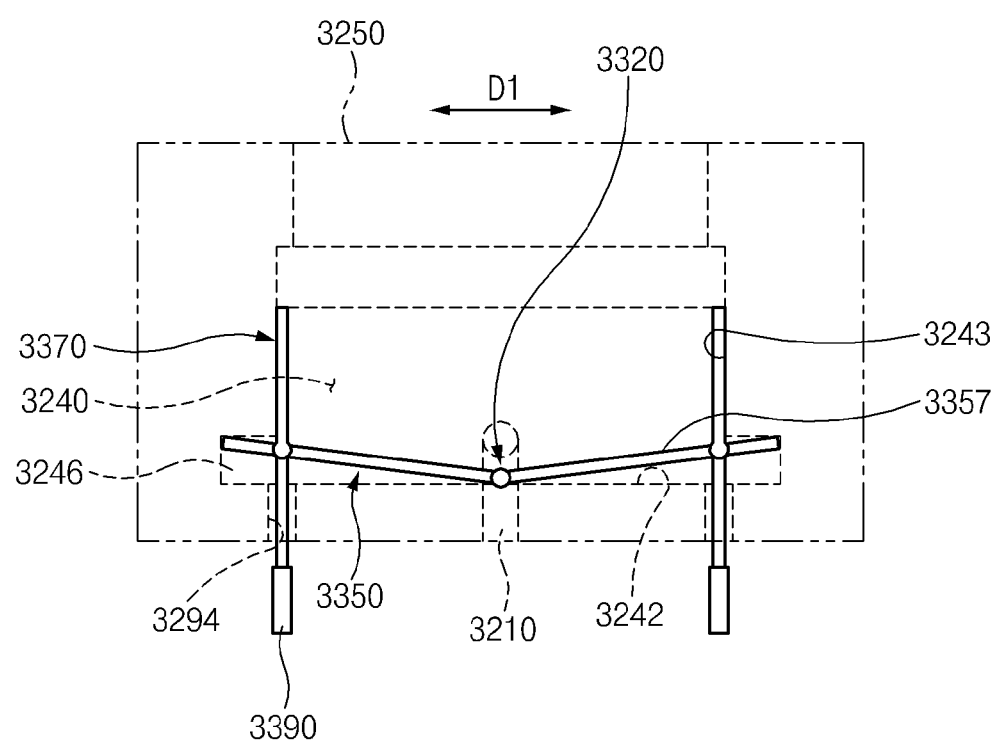
FIG. 35 is a plan view illustrating the slot die coater of FIG. 34.
Figure 36:
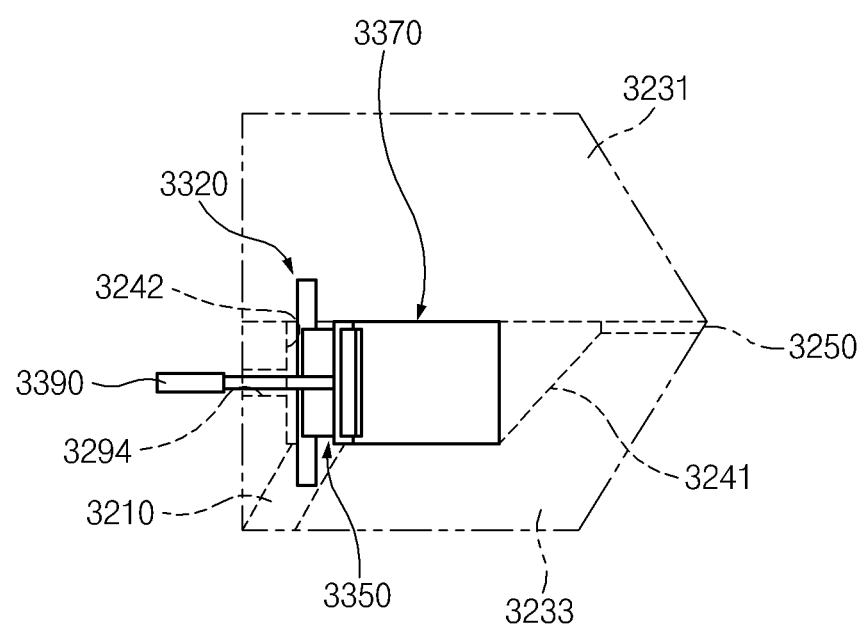
FIG. 36 is a side view illustrating the slot die coater of FIG. 34.
Figure 37:
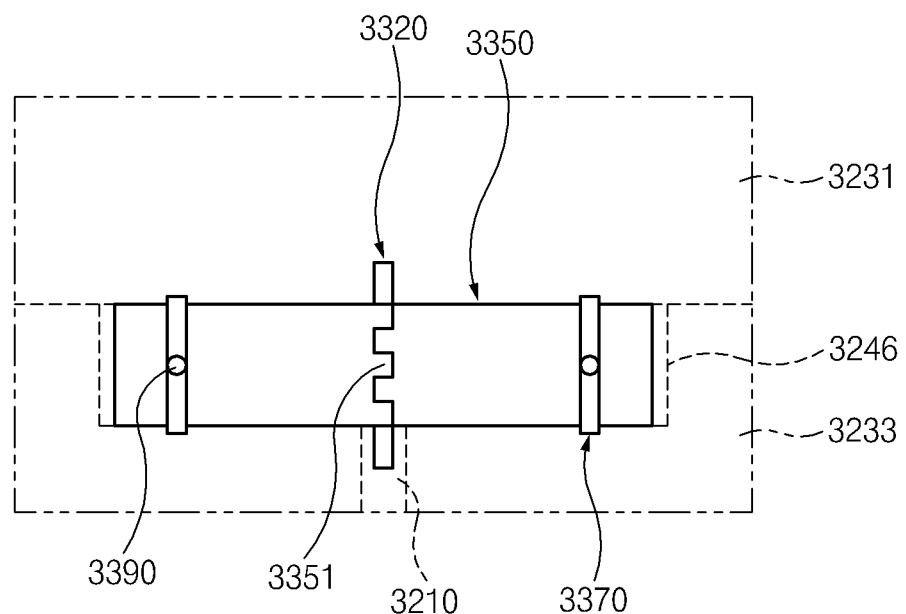
FIG. 37 is a bottom view illustrating the slot die coater of FIG. 34.

FIG. 34 is a perspective view illustrating a case in which slope surfaces are formed by the movable member of the slot die coater illustrated in FIG. 30. FIG. 35 is a plan view illustrating the slot die coater of FIG. 34. FIG. 36 is a side view illustrating the slot die coater of FIG. 34. FIG. 37 is a bottom view illustrating the slot die coater of FIG. 34.

When FIGS. 34 to 37 are compared with FIGS. 30 to 33, FIGS. 34 to 37 illustrate a state of the slot die coater in which the lateral plate members 3370 are moved to the discharge hole 3250 along the third side surfaces 3243 by the handle members 3390.

When the lateral plate members 3370 are moved to the discharge hole 3250, the second ends of the back plate members 3350 coupled to the first ends of the lateral plate members 3370 are also moved to the discharge hole 3250. When the second ends of the back plate members 3350 are moved to the discharge hole 3250, since the column member 3320 is fixed, the back plate members 3350 are rotated about the column member 3320. When the back plate members 3350 rotate about the column member 3320, the front surfaces 3357 of the back plate members 3350 form the slope surfaces directed from the second side surface 3242 to the third side surfaces 3243. As such, the movable member 3300 forms the slope surfaces directed from the second side surface 3242 to the third side surfaces 3243.

The back plate members 3350 of the movable member 3300 form the slope surfaces directed from the second side surface 3242 to the third side surfaces 3243 in order to reduce stagnation regions of the electrode slurry generated at the corners between the second and third side surfaces 3242 and 3243. The electrode slurry is more easily guided to the discharge hole 3250 along the slope surfaces, thereby preventing the electrode slurry from stagnating at the corners between the second and third side surfaces 3242 and 3243 of the inner space 3240.

If the electrode slurry flows to the corners between the second and third side surfaces 3242 and 3243, a moving distance of the electrode slurry is increased, and an amount and force of the electrode slurry surging from the rear side thereof is decreased. Accordingly, the electrode slurry stagnates at the corners. Thus, the slope surfaces fundamentally prevent the electrode slurry from flowing to the corners between the second and third side surfaces 3242 and 3243, thereby eliminating the stagnation regions.

In this case, a gap formed in the movable member 3300 or a gap between coupled portions of the upper die 3231, the shim 3232, and the lower die 3233 may be sealed to prevent the electrode slurry from leaking through the gaps.

Figure 38:
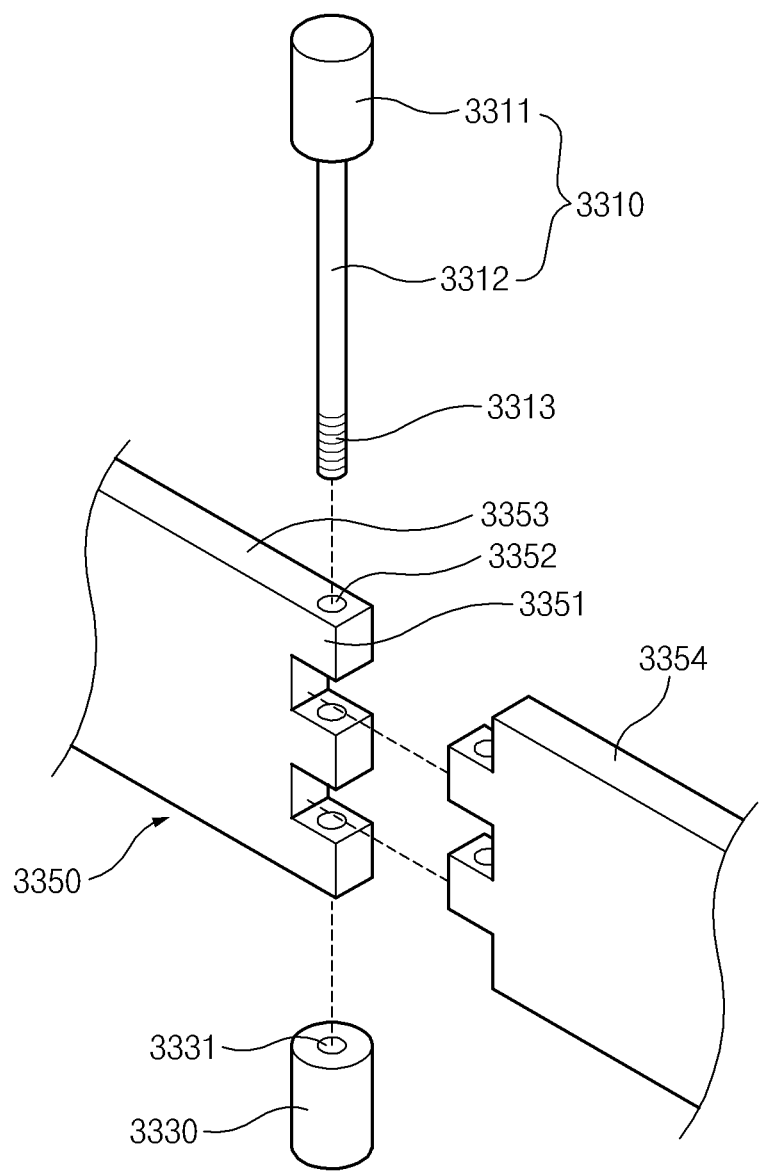
FIG. 38 is an exploded perspective view illustrating a column member and back plate members.
Figure 39:
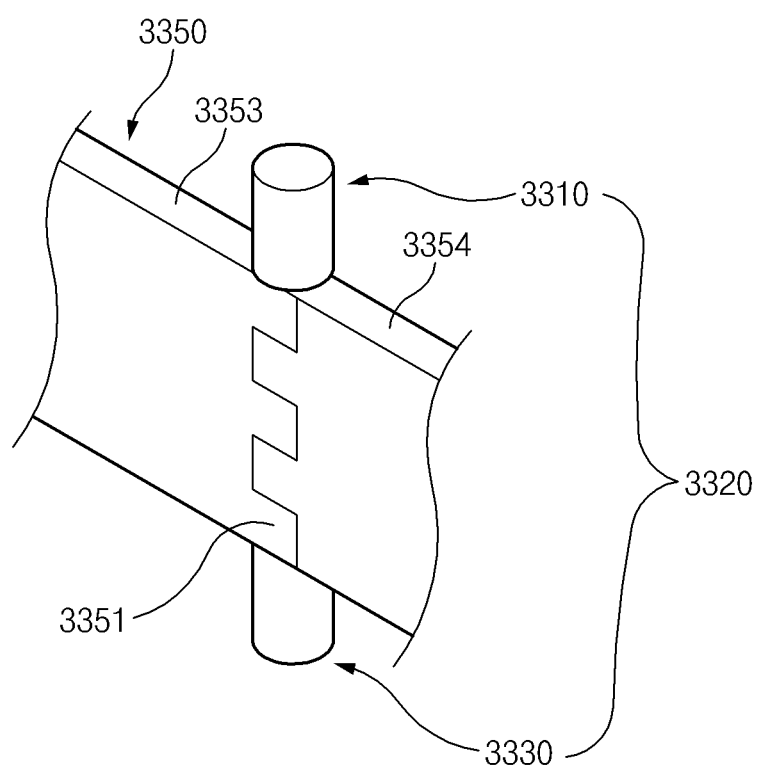
FIG. 39 is a perspective view illustrating a state in which a column member and back plate members are assembled.

FIG. 38 is an exploded perspective view illustrating a column member and back plate members. FIG. 39 is a perspective view illustrating a state in which the column member and the back plate members are assembled. FIGS. 38 and 39 are detailed views illustrating a column member and back plate members according to the third embodiment.

The column member 3320 includes a male column 3310 and a female column 3330. The male column 3310 includes a head 3311 and a rod 3312. The head 3311 has a cylindrical shape according to the current embodiment, but is not limited thereto. The head 3311 is directly fixed to the upper die 3231. The rod 3312 extends from the lower end part of the head 3311. The rod 3312 has a cylindrical bar shape. A screw thread 3313 is formed in an outer circumferential surface of the lower end part of the rod 3312. The head 3311 and the screw thread 3313 are disposed at both ends parts of the rod 3312, respectively.

The female column 3330 is directly fixed to the lower die 3233. The female column 3330 illustrated in FIG. 38 has a cylindrical shape, but is not limited thereto. The female column 3330 has a coupling hole 3331 in the upper surface thereof. A screw thread corresponding to the screw thread 3313 formed in the rod 3312 is formed in an inner surface of the coupling hole 3331. The rod 3312 is inserted in the coupling hole 3331. The male column 3310 and the female column 3330 are screwed to each other through the screw thread 3313 formed in the outer circumferential surface of the rod 3312 and the screw thread formed in the coupling hole 3331.

The back plate members 3350 include one or more protrusion blocks 3351 extending from an end directed to the column member 3320. Referring to FIG. 38, the protrusion blocks 3351 are arrayed at regular intervals. The protrusion blocks 3351 formed in a right back plate member 3354 that is the back plate member 3350 disposed at the right side of the column member 3320 are inserted between the protrusion blocks 3351 formed in a left back plate member 3353 that is the back plate member 3350 disposed at the left side of the column member 3320. Accordingly, the left back plate member 3353 and the right back plate member 3354 are coupled to each other.

Through holes 3352 are formed in the protrusion blocks 3351 of the back plate members 3350. The rod 3312 of the male column 3310 passes through the through holes 3352. The through holes 3352 have no screw thread therein. A lubricant may be applied to inner parts of the through holes 3352, so that the back plate members 3350 can more smoothly rotate about the rod 3312.

The left back plate member 3353 and the right back plate member 3354 are coupled to each other such that the protrusion blocks 3351 engage with one another. In this case, the through holes 3352 communicate with one another. After that, the rod 3312 is inserted into the through holes 3352, and the coupling hole 3331 of the female column 3330 is coupled to the lower end part of the rod 3312. Accordingly, the back plate members 3350 are rotatably coupled to the column member 3320. After the coupling, the back plate members 3350 can rotate about the column member 3320.

Figure 40:
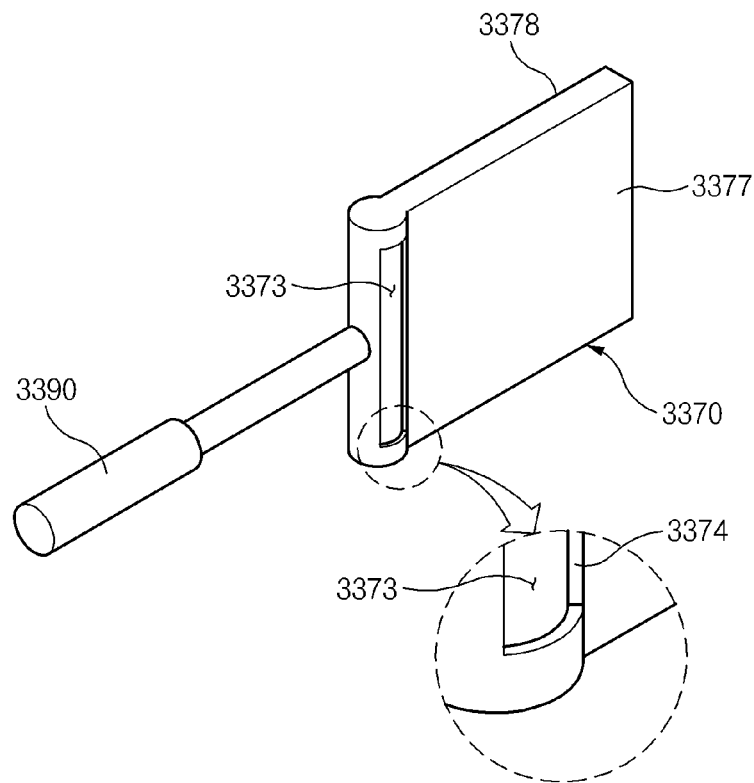
FIG. 40 is a perspective view illustrating a lateral plate member in a state where a rotator is not inserted in a rotation space.
Figure 41:
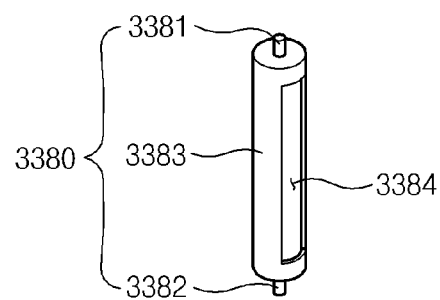
FIG. 41 is a perspective view illustrating a rotator.
Figure 42:
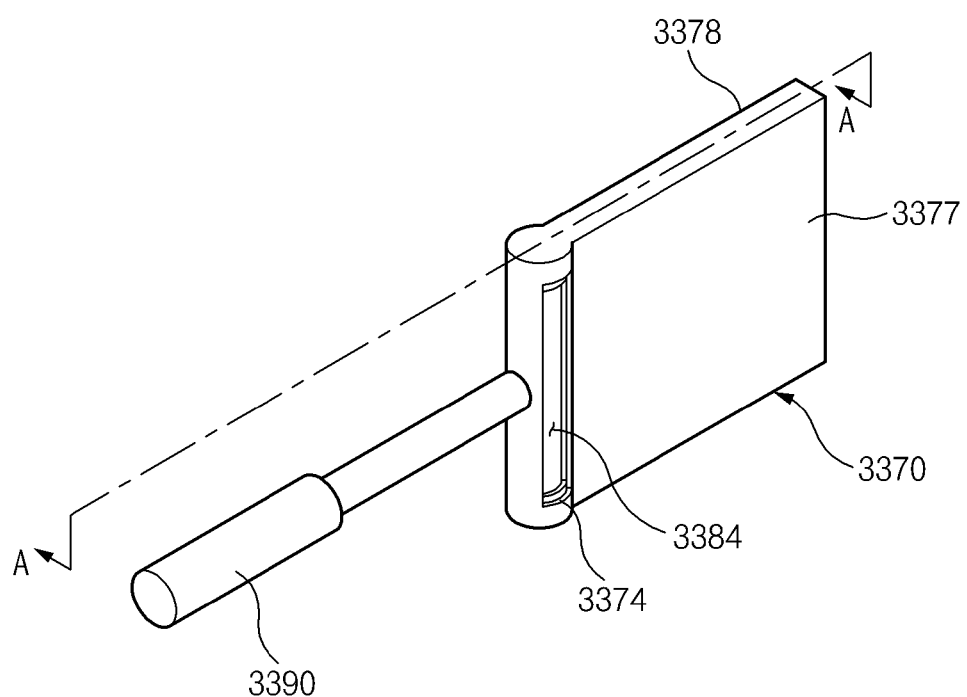
FIG. 42 is a perspective view illustrating a lateral plate member in a state where a rotator is inserted in a rotation space.
Figure 43:
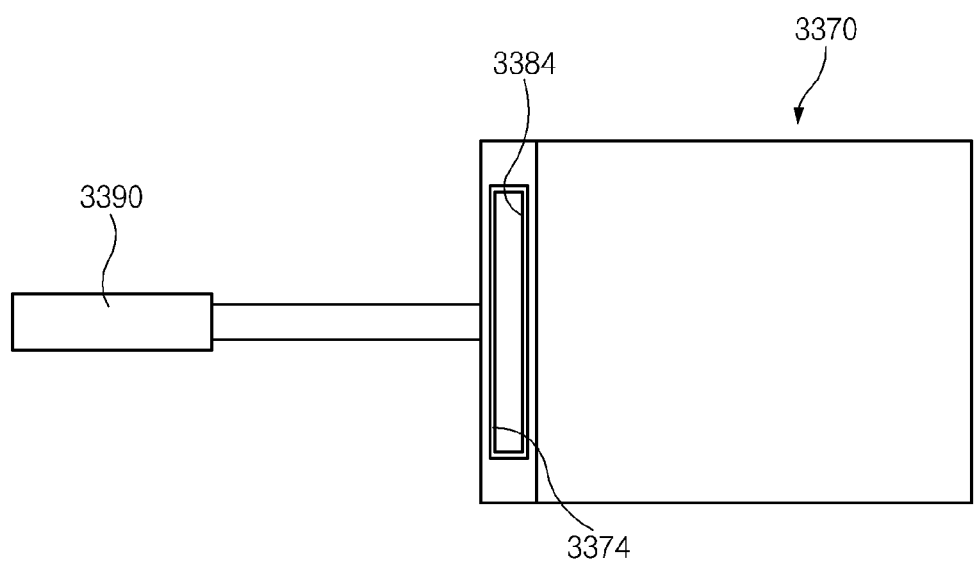
FIG. 43 is a front view illustrating the lateral plate member of FIG. 42.
Figure 44:
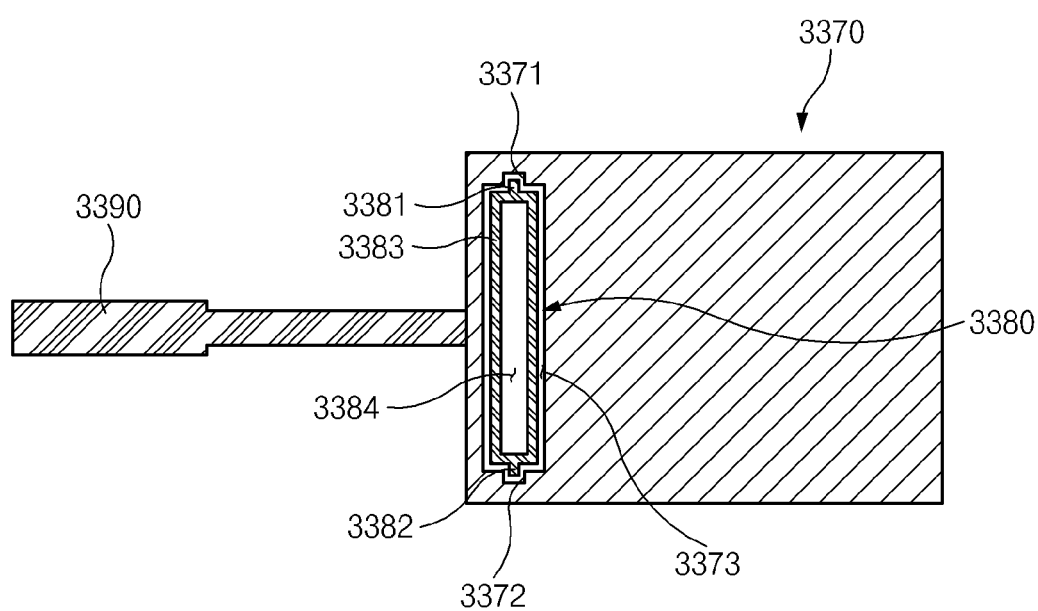
FIG. 44 is a cross-sectional view taken along line A-A of FIG. 42.

FIG. 40 is a perspective view illustrating a lateral plate member in a state where a rotator is not inserted in a rotation space. For convenience, a handle member is attached to the lateral plate member. FIG. 41 is a perspective view illustrating the rotator. FIG. 42 is a perspective view illustrating the lateral plate member in a state where the rotator is inserted in the rotation space. FIG. 43 is a front view illustrating the lateral plate member of FIG. 42. FIG. 44 is a cross-sectional view taken along line A-A of FIG. 42. FIGS. 40 to 44 detailed views illustrating a lateral plate member.

Figure 45:
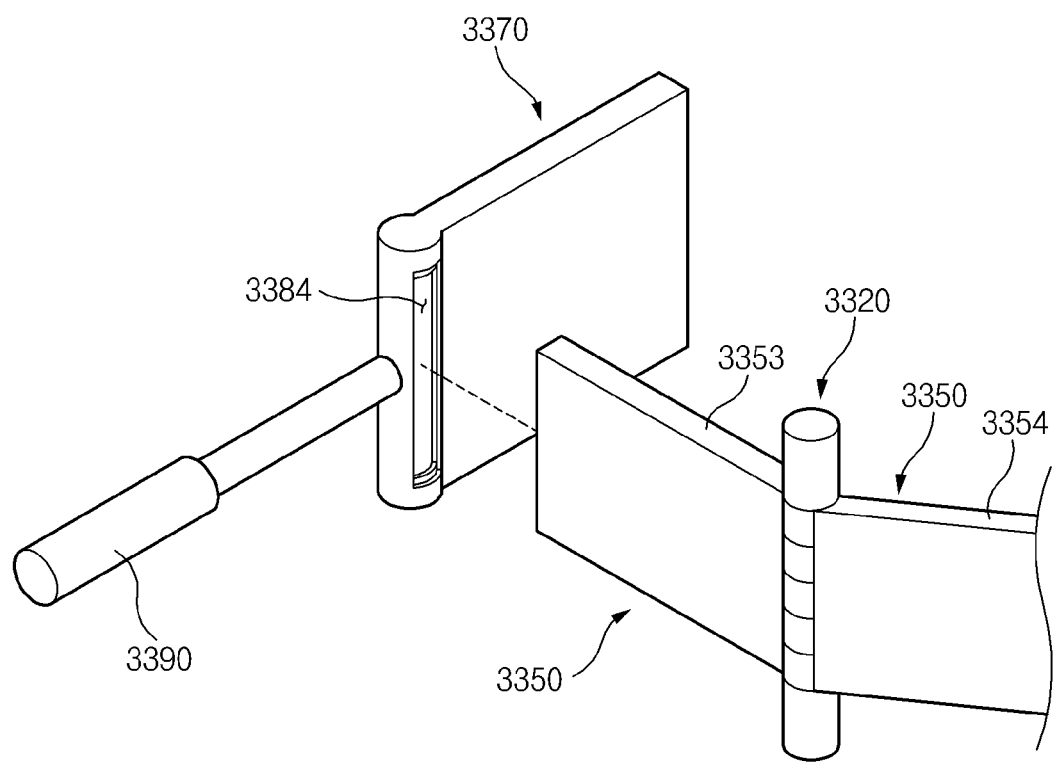
FIG. 45 is a perspective view illustrating a method of coupling a back plate member to a lateral plate member.

FIG. 45 is a perspective view illustrating a method of coupling a back plate member to the lateral plate member.

Referring to FIGS. 40 to 45, the lateral plate member 3370 includes a rotation space 3373 and a rotator 3380. The rotation space 3373 is formed in the first end of the lateral plate member 3370. The rotation space 3373 communicates with the outside through lateral holes 3374 in two side surfaces of the lateral plate member 3370. The rotator 3380 is rotatably inserted in the rotation space 3373. The rotation space 3373 has a cylindrical shape according to the third embodiment, but is not limited thereto. The rotation space 3373 is provided with a first recess 3371 and a second recess 3372 at the upper and lower sides thereof, which correspond to a first protrusion 3381 and a second protrusion 3382 to be described later, respectively.

The rotator 3380 includes a receiver 3383, the first protrusion 3381, and the second protrusion 3382. The receiver 3383 has a cylindrical shape according to the current embodiment. An insertion hole 3384 is formed in the receiver 3383. The insertion hole 3384 is formed in a direction from a side surface 3377 of the lateral plate member 3370 to a side surface 3378. When the rotator 3380 is inserted in the rotation space 3373, the second end of the back plate member 3350 extending from the column member 3320 to the lateral plate member 3370 is inserted in the insertion hole 3384. The first and second protrusions 3381 and 3382 are formed on the upper and lower surfaces of the receiver 3383, respectively. The first and second protrusions 3381 and 3382 are inserted in the first and second recesses 3371 and 3372, respectively. The rotator 3380 is rotatably inserted in the rotation space 3373 and rotates about the first and second protrusions 3381 and 3382.

The rotator 3380 inserted in the rotation space 3373 is illustrated in FIGS. 42 to 44. A small gap is formed between the rotator 3380 and the rotation space 3373, so that the rotator 3380 can rotate about the first and second protrusions 3381 and 3382 in the rotation space 3373.

A method of coupling the back plate member to the lateral plate member to allow rotations of the back plate member is illustrated in detail in FIG. 45.

The first end of the back plate member 3350 is rotatably coupled to the column member 3320, and the second end of the back plate member 3350 is inserted into the insertion hole 3384 formed in the rotator 3380 of the lateral plate member 3370 and is thus coupled to the lateral plate member 3370. At this point, the second end of the back plate member 3350 passes through the lateral holes 3374 and the insertion hole 3384 and thus couples to the lateral plate member 3370.

Since a width of the lateral holes 3374 measured in a direction parallel to the handle members 3390 is greater than the width of the insertion hole 3384, even when the back plate member 3350 is inserted in the insertion hole 3384, the rotator 3380 can rotate in the rotation space 3373. However, the width of the lateral holes 3374 may delimit a rotation angle range of the back plate member 3350.

A process of forming a slope surface will now be described in detail. When the lateral plate member 3370 is moved using the handle member 3390 along the third side surface 3243 to the discharge hole 3250 (in the discharge direction of the electrode slurry), the rotator 3380 and the lateral plate member 3370 are linearly moved to the discharge hole 3250 first. At this point, a degree of moving the lateral plate member 3370 to the discharge hole 3250 may be adjusted according to a degree of inserting the handle member 3390 from the outside of the slot die coater to the inside thereof.

The rotator 3380 with the insertion hole 3384 coupled to the second end of the back plate member 3350 is linearly moved, and simultaneously, is rotated in the rotation space 3373 about an axis connecting the first protrusion 3381 to the second protrusion 3382. At this point, an angle between the lateral plate member 3370 and the back plate member 3350 is increased, and the second end of the back plate member 3350 inserted in the insertion hole 3384 is moved to the discharge hole 3250. Also at this point, the back plate member 3350 is rotated about the column member 3320 that is fixed. Accordingly, the front surface 3357 of the back plate member 3350 forms the slope surface directed from the second side surface 3242 to the third side surface 3243. As such, the movable member 3300 selectively forms the slope surface directed from the second side surface 3242 to the third side surface 3243.

A decrease in volumetric ratio of the stagnation region may be numerically expressed according to a degree of moving the lateral plate member 3370 of the movable member 3300 to the discharge hole 3250. When the inner space 3240 of the body 3230 is cut along a plane perpendicular to the width direction D1 of the discharge hole 3250, a cross section is formed between the first side surface 3241 and the front surface 3357 of the back plate member 3350. When the area of the formed cross section is referred to as a vertical cross sectional area, a decrease in stagnation region according to a movement of the slope surface of the movable member 3300 may be determined based on a ratio of the vertical cross sectional area.

Results of experiments performed based on the ratio of the vertical cross sectional area in specific cases are the same as the results of the experiments in the first and fifth cases according the first embodiment.

Thus, when the inner space 3240 is cut along planes perpendicular to the width direction D1 of the discharge hole 3250, cross sections are formed between the first side surface 3241 and the front surface 3357 of the back plate member 3350, and the areas of the formed cross sections are referred to as vertical cross sectional areas. When the movable member 3300 is installed in the slot die coater such that a ratio of the vertical cross sectional area of the formed cross section closest to the third side surface 3243 to the vertical cross sectional area of the formed cross section closest to the central part of the inner space 3240 ranges from 23.0% to 53.7%, the electrode slurry is prevented from stagnating in the slot die coater, so as to reduce coating defects and maintain flow rates to be uniformly distributed at the outlet of the slot die coater.

In addition, a method using an angle may be provided as a method of numerically expressing a decrease in volumetric ratio of the stagnation region according to a degree of moving the lateral plate member 3370 of the movable member 3300 to the discharge hole 3250. Also in this case, results of experiments are the same as the results of the experiments in the first and fifth cases according the first embodiment. To sum up, when the slope surface of the member 3300 forms an angle ranging from 2.8 to 16.7 degrees with the second side surface 3242 of the body 3230, the stagnation region of the electrode slurry in the slot die coater is decreased, so as to reduce coating defects and maintain flow rates to be uniformly distributed at the outlet of the slot die coater.

While the present invention has been particularly shown and described with reference to exemplary embodiments and drawings thereof, it will be understood by those of ordinary skill in the art that various modifications and changes in form and details may be made therein without departing from the spirit and scope of the present invention as defined by the following claims.

What is claimed is:

1. A slot die coater that applies electrode slurry to metal foil to produce an electrode, the slot die coater comprising:
    a die part, which includes a body having an inner space receiving the electrode slurry, a supply hole disposed in the body to supply the electrode slurry to the inner space, and a discharge hole disposed in the body to discharge the electrode slurry from the inner space to the metal foil; and a member for the slot die coater, which is removably installed in the inner space to form a slope surface in the inner space,
    wherein the inner space has a first side surface provided with the discharge hole, a second side surface facing the first side surface, and a third side surface extending from the second side surface to the first side surface, and the slope surface is inclined from the second side surface to the third side surface,
    wherein the member is a movable member for the slot die coater, which is removably installed in the inner space to selectively form a slope surface in the inner space,
    wherein the movable member includes: a column member fixed to the body; and a back plate member, an end of which is rotatably coupled to the column member, and another end of which extends to the third side surface, and
    wherein the back plate member rotates about the column member to form the slope surface.

2. The slot die coater of claim 1, wherein the movable member guides the electrode slurry along the slope surface to the discharge hole to prevent the electrode slurry from stagnating at a corner between the second side surface and the third side surface.

3. The slot die coater of claim 1, wherein the slope surface is provided in plurality to be disposed at the left and right sides of the supply hole, respectively.

4. The slot die coater of claim 1, wherein the column member includes a head, a male column including a rod having a cylindrical shape having a width smaller than that of the head and extending from the head to the outside thereof, and a female column coupled to an end of the rod, and
    a screw thread is formed in an outer circumferential surface of the end of the rod of the male column, and the female column has a coupling hole, an inner surface of which is provided with a screw thread corresponding to the screw thread of the rod.

5. The slot die coater of claim 4, wherein the back plate member includes one or more protrusion blocks extending from the first end of the black plate directed to the column member, and the protrusion block has a through hole through which the rod passes.

6. The slot die coater of claim 1, wherein the back plate member is provided in plurality to be disposed at the left and right sides of the column member, respectively.

7. The slot die coater of claim 1, wherein the movable member further includes a lateral plate member, an end of which is rotatably coupled to the second end of the back plate member, and another end of which extends to the discharge hole,
    wherein when the lateral plate member moves along the third side surface to the discharge hole, the back plate member rotates about the column member to form the slope surface.

8. The slot die coater of claim 7, wherein the lateral plate member includes: a rotation space formed in the first end of the lateral plate member and communicating with the outside thereof through two side surfaces of the lateral plate member; and a rotator rotatably inserted in the rotation space and having an insertion hole that passes through the lateral plate member from one of the side surfaces of the lateral plate member toward the other side surface to receive the second end of the back plate member.

9. The slot die coater of claim 7, wherein the movable member further includes a handle member, an end of which is connected to the first end of the lateral plate member, and another end of which extends up to the outside of the die part toward the second side surface,
    wherein the handle member adjusts a degree of moving the lateral plate member to the discharge hole according to a degree of inserting the handle member from the outside of the die part to the inside thereof.

10. The slot die coater of claim 1, wherein when the inner space is cut along planes perpendicular to a width direction of the discharge hole, cross sections are formed between the slope surface and the first side surface, and a ratio of the area of the cross section corresponding to the perpendicular plane closest to the third side surface to the area of the cross section corresponding to the perpendicular plane closest to the central part of the inner space ranges from 23.0% to 53.7%.

11. The slot die coater of claim 1, wherein the slope surface forms an angle ranging from 2.8 degrees to 16.7 degrees with the second side surface.

* * * * *